(12) United States Patent
Iwamoto et al.

(10) Patent No.: US 12,043,481 B2
(45) Date of Patent: *Jul. 23, 2024

(54) CONVEYANCE SYSTEM AND CONVEYANCE METHOD

(71) Applicant: TOYOTA JIDOSHA KABUSHIKI KAISHA, Toyota (JP)

(72) Inventors: Kunihiro Iwamoto, Toyota (JP); Yuta Itozawa, Nagoya (JP); Hirotaka Komura, Tokyo-to (JP); Yutaro Takagi, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,796

(22) Filed: Jul. 10, 2023

(65) Prior Publication Data

US 2023/0348187 A1  Nov. 2, 2023

Related U.S. Application Data

(63) Continuation of application No. 17/487,129, filed on Sep. 28, 2021, now Pat. No. 11,738,944.

(30) Foreign Application Priority Data

Oct. 2, 2020 (JP) .................. 2020-168117

(51) Int. Cl.
*B65G 1/04* (2006.01)
*B66F 9/06* (2006.01)
*B66F 9/20* (2006.01)

(52) U.S. Cl.
CPC ......... *B65G 1/0435* (2013.01); *B65G 1/0421* (2013.01); *B66F 9/063* (2013.01); *B66F 9/20* (2013.01)

(58) Field of Classification Search
CPC ...... B65G 1/0435; B65G 1/0492; B66F 9/063
USPC ........................................... 74/22 R
See application file for complete search history.

(56) References Cited

U.S. PATENT DOCUMENTS

| 6,666,241 B1 | 12/2003 | Lee |
| 7,100,725 B2 | 9/2006 | Thorne |
| 9,120,622 B1 | 9/2015 | Elazary et al. |
| 9,637,318 B2 | 5/2017 | Messina |
| 10,913,641 B2 | 2/2021 | Gravelle et al. |
| 11,208,264 B2 | 12/2021 | Moulin et al. |
| 11,338,998 B1 | 5/2022 | Keck et al. |

(Continued)

FOREIGN PATENT DOCUMENTS

| CN | 112607671 A | 4/2021 |
| EP | 3978198 A1 | 4/2022 |

(Continued)

*Primary Examiner* — Kaitlin S Joerger
(74) *Attorney, Agent, or Firm* — Dinsmore & Shohl LLP

(57) ABSTRACT

An autonomous mobile robot includes a placement part, an arm configured to extend from and retract into the placement part in a horizontal direction, and a control unit configured to control a movement of the arm. The control unit moves a tip of the arm into a groove formed in a bottom surface of an object supported from underneath thereof, and then the control unit returns the tip of the arm hooked in the groove to the placement part, or the control unit moves the tip of the arm hooked in a groove formed in a bottom surface of an object placed on the placement part toward a rack configured to support the object from underneath thereof.

6 Claims, 29 Drawing Sheets

(56) References Cited

U.S. PATENT DOCUMENTS

| | | |
|---|---|---|
| 11,407,588 B2 | 8/2022 | Durai |
| 2015/0037129 A1 | 2/2015 | Okamoto |
| 2015/0081089 A1 | 3/2015 | Kapust et al. |
| 2019/0169774 A1 | 6/2019 | Shomura |
| 2019/0315254 A1 | 10/2019 | Tucker et al. |
| 2020/0216298 A1 | 7/2020 | Gravelle et al. |
| 2022/0258358 A1 | 8/2022 | Itozawa et al. |
| 2022/0258974 A1 | 8/2022 | Iwamoto et al. |
| 2022/0259023 A1 | 8/2022 | Iwamoto et al. |
| 2022/0259024 A1 | 8/2022 | Itozawa et al. |
| 2022/0267091 A1 | 8/2022 | Ota et al. |
| 2022/0274777 A1 | 9/2022 | Ota et al. |
| 2022/0324039 A1 | 10/2022 | Young et al. |

FOREIGN PATENT DOCUMENTS

| | | |
|---|---|---|
| JP | 2022-060104 A | 4/2022 |
| WO | 2017/090108 A1 | 6/2017 |
| WO | 2019/089923 A1 | 5/2019 |
| WO | 2019/232652 A1 | 12/2019 |

CONVEYANCE SYSTEM AND CONVEYANCE METHOD

CROSS REFERENCE TO RELATED APPLICATIONS

This application is a continuation application of U.S. patent application Ser. No. 17/487,129, filed Sep. 28, 2021, which is based upon and claims the benefit of priority from Japanese patent application No. 2020-168117, filed on Oct. 2, 2020, the disclosure of which is incorporated herein in its entirety by reference.

BACKGROUND

The present disclosure relates to a conveyance system and a conveyance method, and in particular to conveyance by an autonomous mobile robot.

In recent years, a technology for transporting an object by using an autonomous mobile robot in a factory or a warehouse has been developed. For example, International Patent Publication No. WO2017/090108 discloses a shelf arrangement system used in a warehouse for distribution in which shelves are automatically arranged by using a conveyance robot. In this system, a conveyance robot enters a space under a shelf, lifts the shelf from underneath thereof, and moves while supporting the shelf.

SUMMARY

The system described in International Patent Publication No. WO2017/090108 is for conveying objects placed on the floor. Therefore, the system cannot convey an object to be stored into a rack.

The present disclosure has been made in view of the above-described circumstances and an object thereof is to provide a conveyance system and a conveyance method capable of conveying an object to be stored into a rack.

A first exemplary aspect for achieving the above-described object is a conveyance system configured to convey an object by using an autonomous mobile robot, in which the autonomous mobile robot includes: a placement part; an arm configured to extend from and retract into the placement part in a horizontal direction; and a control unit configured to control a movement of the arm, the control unit moves a tip of the arm into a groove formed in a bottom surface of an object supported from underneath thereof, and then the control unit returns the tip of the arm hooked in the groove to the placement part, or the control unit moves the tip of the arm hooked in a groove formed in a bottom surface of an object placed on the placement part toward a rack configured to support the object from underneath thereof.

According to the above-described conveyance system, by the horizontal movement of the arm, the object is moved from the rack onto the placement part, or from the placement part into the rack. Therefore, the autonomous mobile robot can convey an object to be stored into the rack (or an object stored in the rack).

In the above-described aspect, the arm may include a shaft part extending in a horizontal direction, and a projection part located at a tip of the shaft part and extending in a direction perpendicular to the shaft part.

In this way, the arm can be formed by a simple configuration.

In the above-described aspect, the control unit may rotate the projection part by using the shaft part as a rotation shaft.

In this way, the state of the arm can be easily switched between a state in which the tip of the arm is hooked in the groove and a state in which the tip of the arm is not hooked in the groove.

In the above-described aspect, the conveyance system may further include: a first ball screw disposed parallel to the shaft part of the arm, the first ball screw including a first nut gear; a second ball screw disposed parallel to the shaft part of the arm and the first ball screw, the second ball screw including a second nut gear; and a slider configured to house the first and second nut gears, and move in a direction in which the shaft part extends as the first and second nut gears move, in which the shaft part of the arm may include a gear, the gear may be engaged with at least one of the first and second nut gears inside the slider, and the control unit may control rotation directions of the first and second ball screws.

By the above-described configuration, it is possible to linearly move the arm (i.e., to move the arm in a straight line) and rotate the arm by a simple configuration.

In the above-described aspect, the control unit may change a height of the placement part.

In this way, it is possible move the object from the rack onto the placement part or from the placement part into the rack at an arbitrary height.

In the above-described aspect, the conveyance system may include a container as the object, and a plurality of grooves arranged in a direction in which the object is moved by the arm may be formed in the bottom surface of the object.

In this way, it is possible improve the flexibility of the design regarding the length of the arm.

In the above-described aspect, the conveyance system may include a container as the object, and the groove in the bottom surface of the object may have a V-shape.

In this way, when the object is moved by the arm with the tip thereof being hooked in the groove, the positional relation between the tip of the arm and the object is regulated. Therefore, it is possible to stabilize the movement of the object.

In the above-described aspect, the conveyance system may include a container as the object, and the groove in the bottom surface of the object may have a circular shape, an elliptical shape, or a rhombus shape.

In this way, when the object is moved by the arm with the tip thereof being hooked in the groove, the positional relation between the tip of the arm and the object is regulated irrespective of whether the object is moved from the rack onto the placement part or from the placement part into the rack. Therefore, it is possible to stabilize the movement of the object irrespective of whether the object is moved from the rack onto the placement part or from the placement part into the rack.

Another exemplary aspect for achieving the above-described object is a method for conveying an object by using an autonomous mobile robot, the autonomous mobile robot including a placement part and an arm configured to extend from and retract into the placement part in a horizontal direction, the method including: moving a tip of the arm of the autonomous mobile robot to a groove formed in a bottom surface of an object supported from underneath thereof, and then returning the tip of the arm hooked in the groove to the placement part; or moving the tip of the arm hooked in a groove formed in a bottom surface of an object placed on the placement part toward a rack configured to support the object from underneath thereof.

According to the above-described conveyance method, by the horizontal movement of the arm, an object is moved from the rack onto the placement part, or from the placement part into the rack. Therefore, the autonomous mobile robot can convey an object to be stored into the rack (or an object stored in the rack).

According to the present disclosure, it is possible provide a conveyance system and a conveyance method capable of conveying an object to be stored into a rack.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Embodiments according to the present disclosure will be described hereinafter with reference to the drawings.

Figure 1:
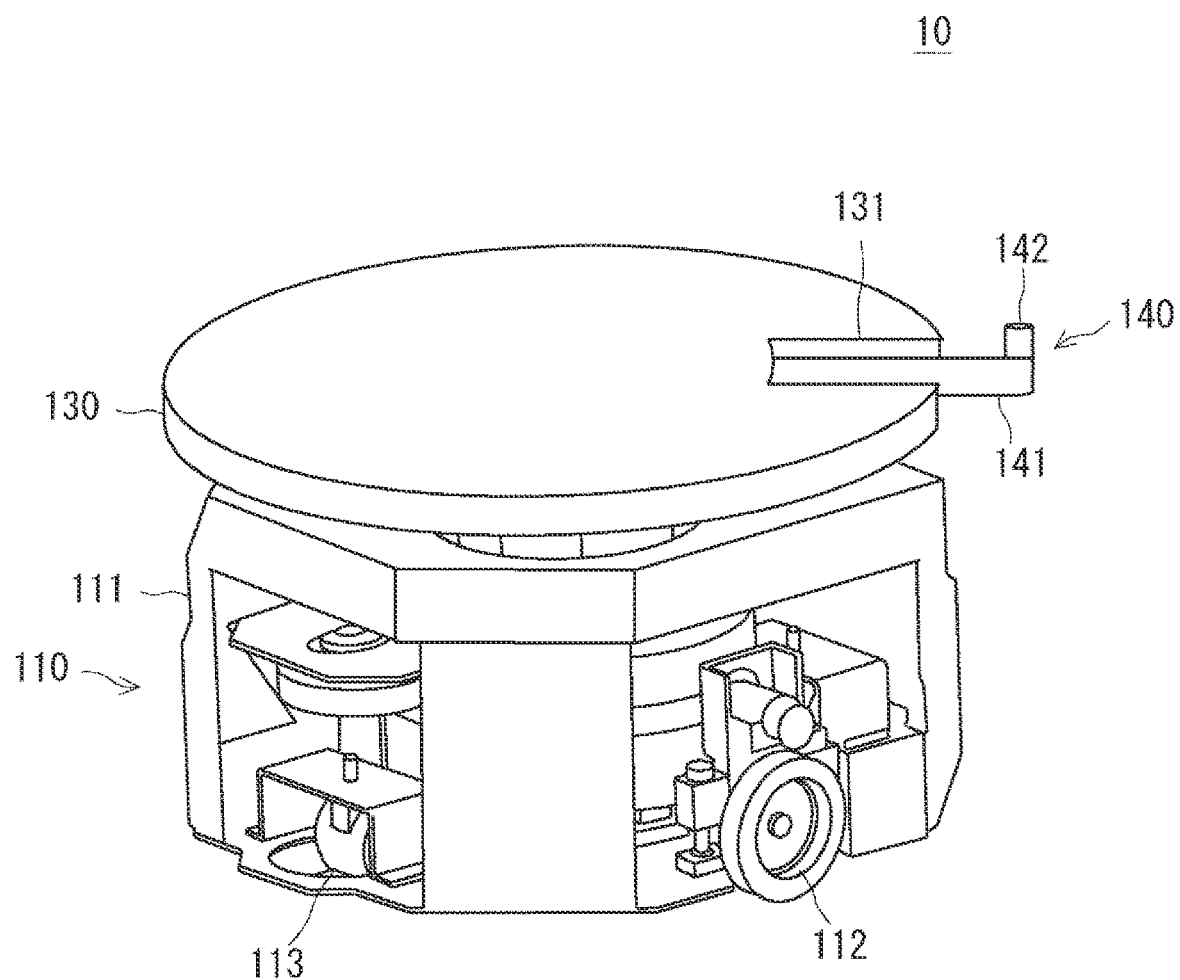
FIG. 1 is a perspective view showing a schematic configuration of an autonomous mobile robot according to an embodiment.
Figure 2:
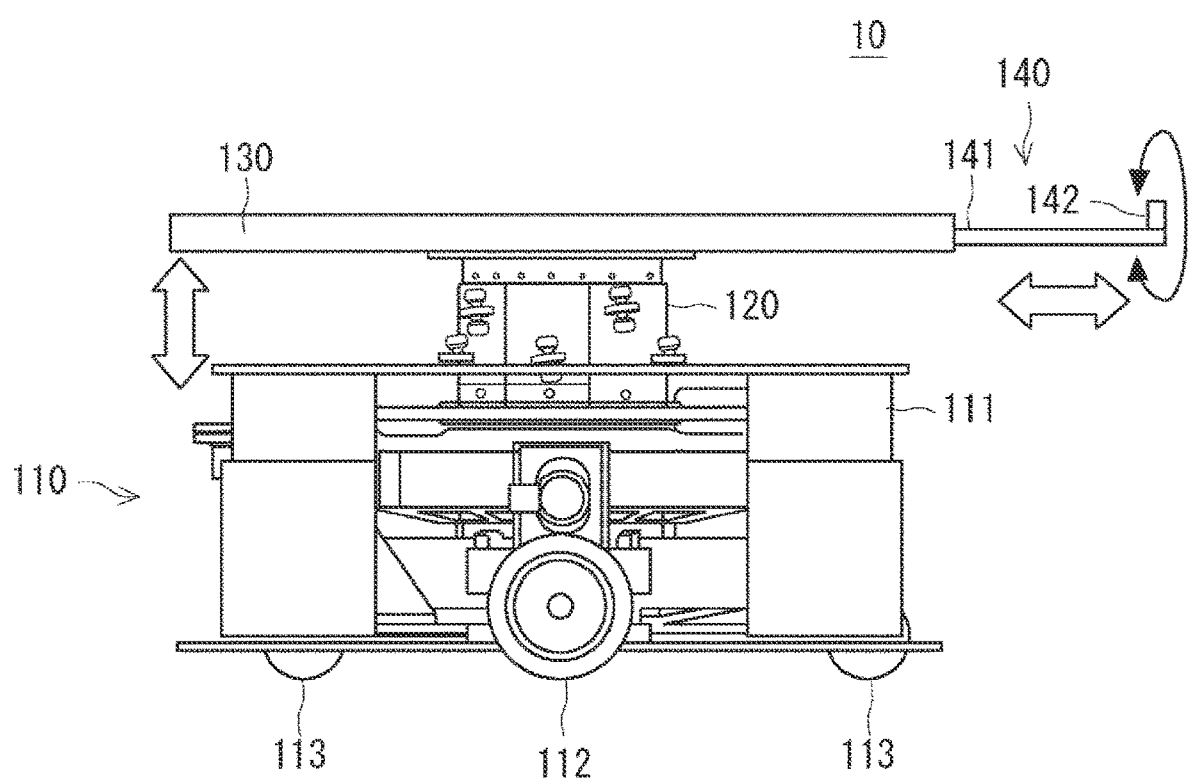
FIG. 2 is a side view showing a schematic configuration of the autonomous mobile robot according to the embodiment.
Figure 3:
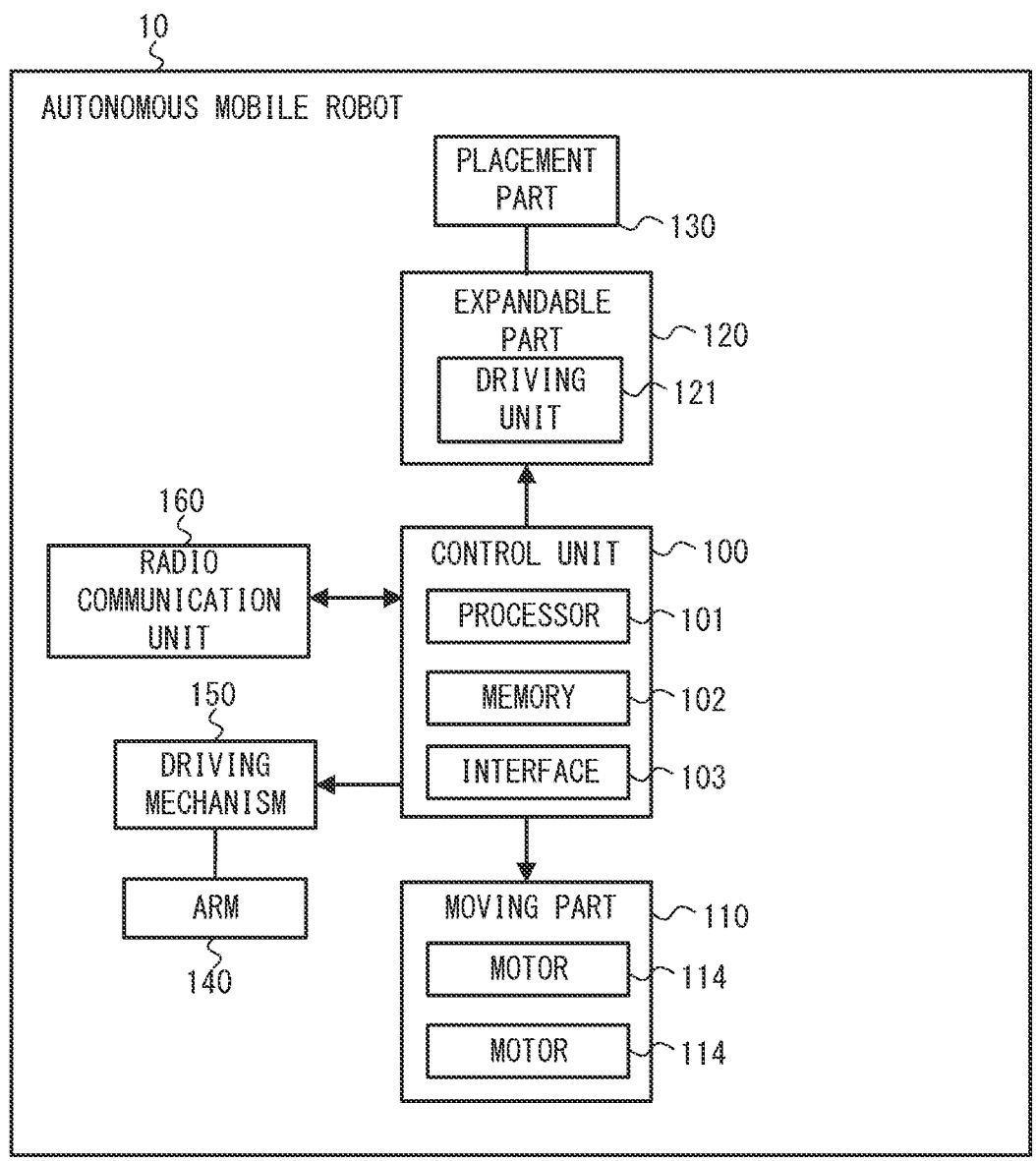
FIG. 3 is a block diagram showing a schematic system configuration of the autonomous mobile robot according to the embodiment.

FIG. 1 is a perspective view showing a schematic configuration of an autonomous mobile robot 10 according to an embodiment. FIG. 2 is a side view showing a schematic configuration of the autonomous mobile robot 10 according to the embodiment. FIG. 3 is a block diagram showing a schematic system configuration of the autonomous mobile robot 10 according to the embodiment.

An autonomous mobile robot 10 according to this embodiment may be a robot that autonomously moves in a moving environment such as in a house, in an institution, in a warehouse, in a factory, or outdoors, and may belong to a conveyance system that supports and conveys an object by using the autonomous mobile robot 10. The autonomous mobile robot 10 according to this embodiment includes a movable moving part 110, an expandable part 120 that vertically expands/contracts, a placement part 130 by which an object placed thereon is supported, an arm 140, a driving mechanism 150, a control unit 100 that controls the autonomous mobile robot 10, i.e., controls the moving part 110, the expandable part 120, the arm 140 and so on, and a radio communication unit 160.

The moving part 110 includes a robot main-body 111, a pair of right and left driving wheels 112 rotatably disposed in the robot main-body 111, a pair of front and rear trailing wheels 113 rotatably disposed in the robot main-body 111, and a pair of motors 114 that rotationally drive the respective driving wheels 112. Each of the motors 114 rotates a respective one of the driving wheels 112 through a speed reducer or the like. Each of the motors 114 rotates a respective one of the driving wheels 112 according to a control signal sent from the control unit 100, thereby enabling the robot main-body 111 to move forward, move backward, and rotate. In this way, the robot main-body 111 can move to an arbitrary place. Note that the above-described configuration of the moving part 110 is merely an example and the configuration of the moving part 110 is not limited to this example. For example, the respective numbers of the driving wheels 112 and the trailing wheels 113 of the moving part 110 may be arbitrary determined, and any configuration may be used as long as it can move the robot main-body 111 to an arbitrary place.

The expandable part 120 is an expanding/contracting mechanism that expands/contracts in the vertical direction. The expandable part 120 may be formed as a telescopic expanding/contracting mechanism. The placement part 130 is provided in the upper-end part of the expandable part 120, and the placement part 130 is raised or lowered by the movement of the expandable part 120. The expandable part 120 includes a driving unit 121 such as a motor, and expands/contracts by the driving of the driving unit 121. That is, the placement part 130 is raised or lowered by the driving of the driving unit 121. The driving unit 121 drives in accordance with a control signal sent from the control unit 100. Note that any known mechanism for controlling the height of the placement part 130 disposed above the robot main-body 111 may be used in place of the expandable part 120 in the autonomous mobile robot 10.

The placement part 130 is disposed in the upper part (at the top) of the expandable part 120. The placement part 130 is raised and lowered by the driving unit 121 such as a motor, and in this embodiment, the placement part 130 is used as a place where an object to be conveyed by the autonomous mobile robot 10 is placed. In order to convey an object, the autonomous mobile robot 10 moves with the object while supporting the object by the placement part 130. In this way, the autonomous mobile robot 10 conveys the object.

The placement part 130 is composed of, for example, a plate member serving as an upper surface and a plate member serving as a lower surface, and has a space for accommodating the arm 140 and the driving mechanism 150 between the upper and lower surfaces. In this embodiment, the shape of each of these plate members, that is, the shape of the placement part 130 is, for example, a flat disk-like shape, but may be any other shape. More specifically, in this embodiment, a cut-out part 131 is formed in the placement part 130 along a line along which the arm 140 is moved in order to prevent a projection part 142 of the arm 140 from colliding with the placement part 130 when the arm 140 is moved. Note that the cut-out part 131 is formed at least in the upper surface of the placement part 130.

In the placement part 130, the arm 140, which extends from and retracts into the placement part 130 in the horizontal direction, is provided. The arm 140 includes a shaft part 141 extending in the horizontal direction, and the projection part 142 located at the tip of the shaft part 141 and extending in a direction vertical to the shaft part 141. That is, in this embodiment, the arm 140 has an L-shape. Further, in the placement part 130, a driving mechanism 150 for moving the arm 140 in the horizontal direction (in other words, in a direction along the shaft part 141, and in still other words, in the longitudinal direction of the arm 140) and for rotating the shaft part 141 according to a control signal(s) sent from the control unit 100 is provided. The driving mechanism 150 includes, for example, a motor(s) and a linear guide(s), and thereby moves the arm 140 in the horizontal direction and rotates the shaft part 141. However, any known mechanism for performing these movements may be used as the driving mechanism 150. Note that details of the driving mechanism 150 in this embodiment will be described later.

As described above, the arm 140 is movable in the horizontal direction, and the projection part 142 can be rotated by the rotation of the shaft part 141. That is, the projection part 142 is can be rotated by using the shaft part 141 as a rotation shaft.

Figure 4A:
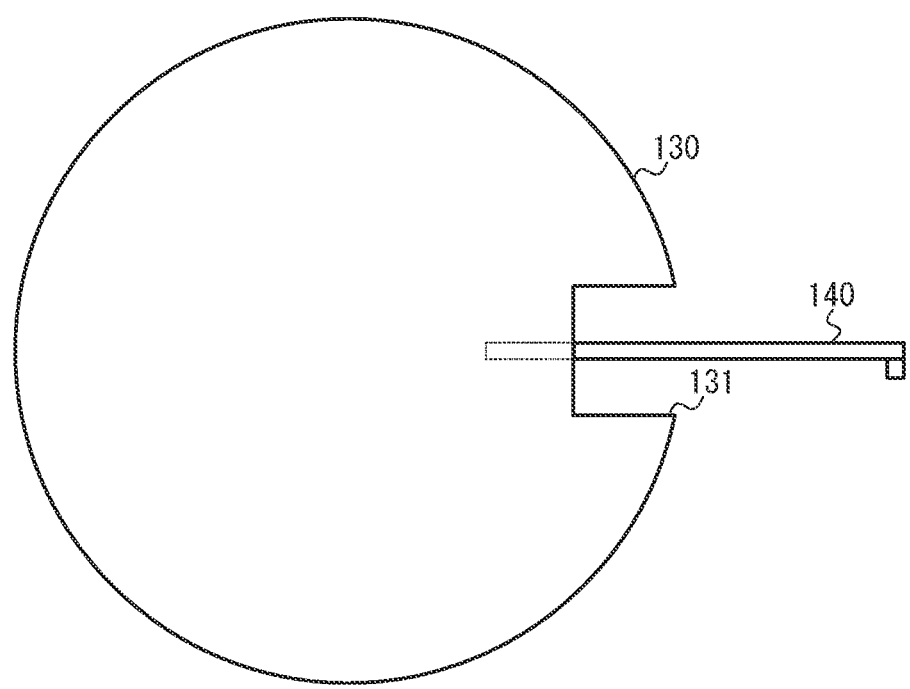
FIG. 4A is a plan view of a placement part in a state in which the tip of an arm protrudes outward in the horizontal direction of the placement part.
Figure 4B:
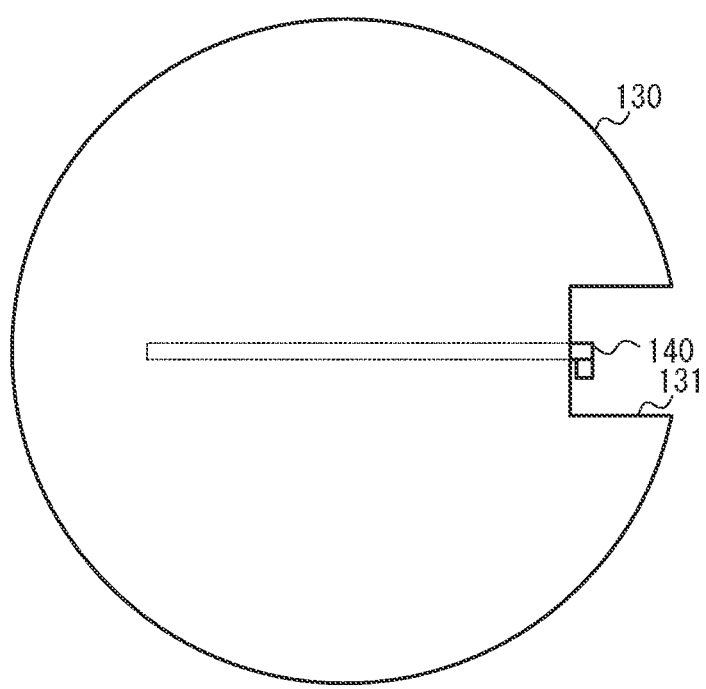
FIG. 4B is a plan view of the placement part in a state in which the tip of the arm is retracted into the placement part.

Here, the horizontal movement of the arm 140 is shown in the drawings. FIG. 4A is a plan view of the placement part 130 in a state in which the tip of the arm 140 protrudes beyond the placement part 130 in the horizontal direction. Further, FIG. 4B is a plan view of the placement part 130 in a state in which the tip of the arm 140 is retracted into the placement part 130. Note that, as shown in the drawing, the cut-out part 131 of the placement part 130 is a cut-out part having a predetermined length, extending from the outer peripheral edge of the placement part 130 along the axis of the arm 140. Specifically, as shown in FIG. 4B, the position of the end of the cut-out part 131 corresponds to the position of the tip (the projection part 142) of the arm 140 in the state where the arm 140 is retracted as much as possible to the placement part 130 side. As described above, since the cut-out part 131 is formed in the placement part 130, the projection part 142 of the arm 140 can be retracted to the inside of the outer periphery of the placement part 130.

Figure 5A:
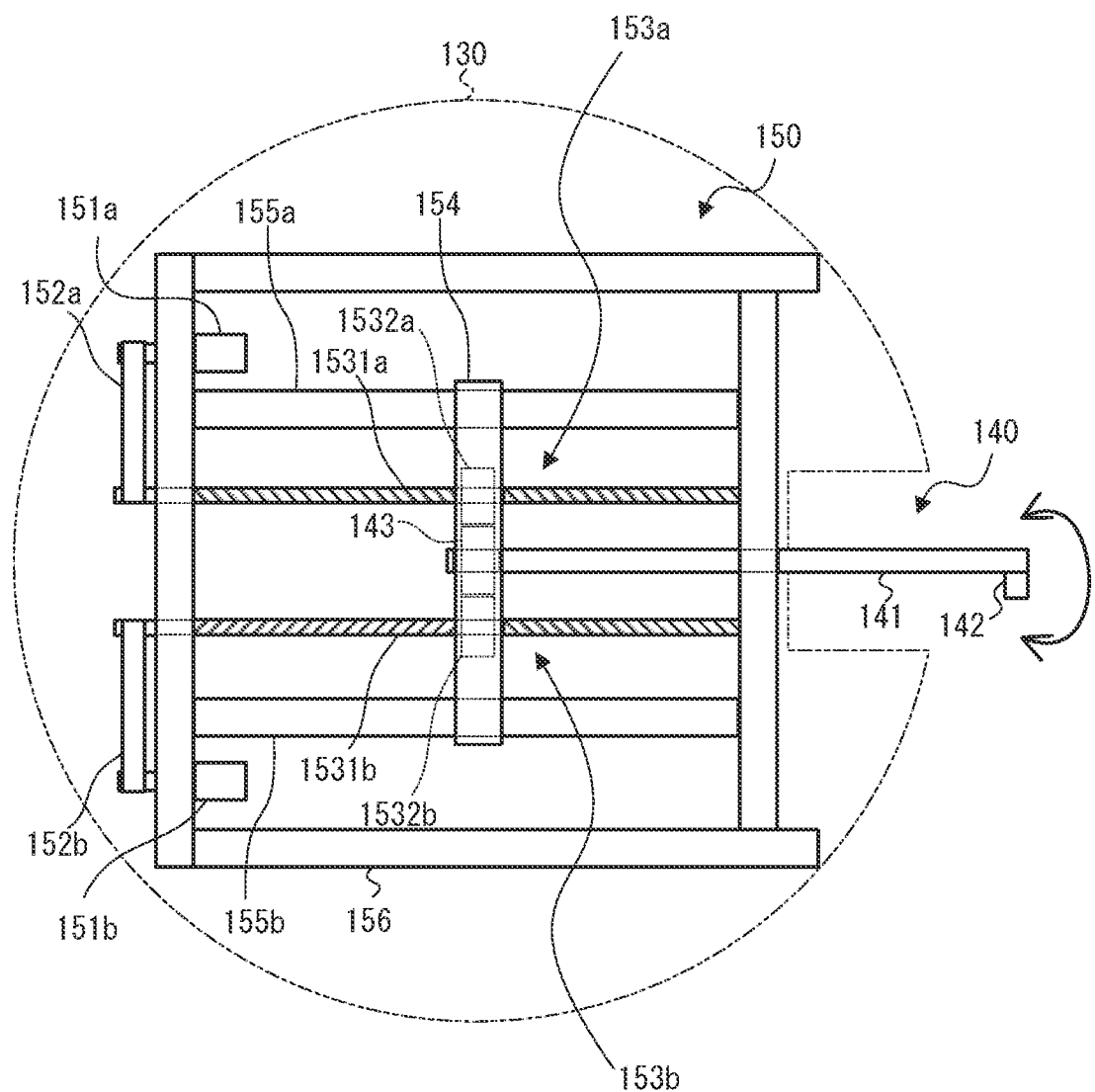
FIG. 5A is a schematic diagram showing an example of a configuration of a driving mechanism.
Figure 5B:
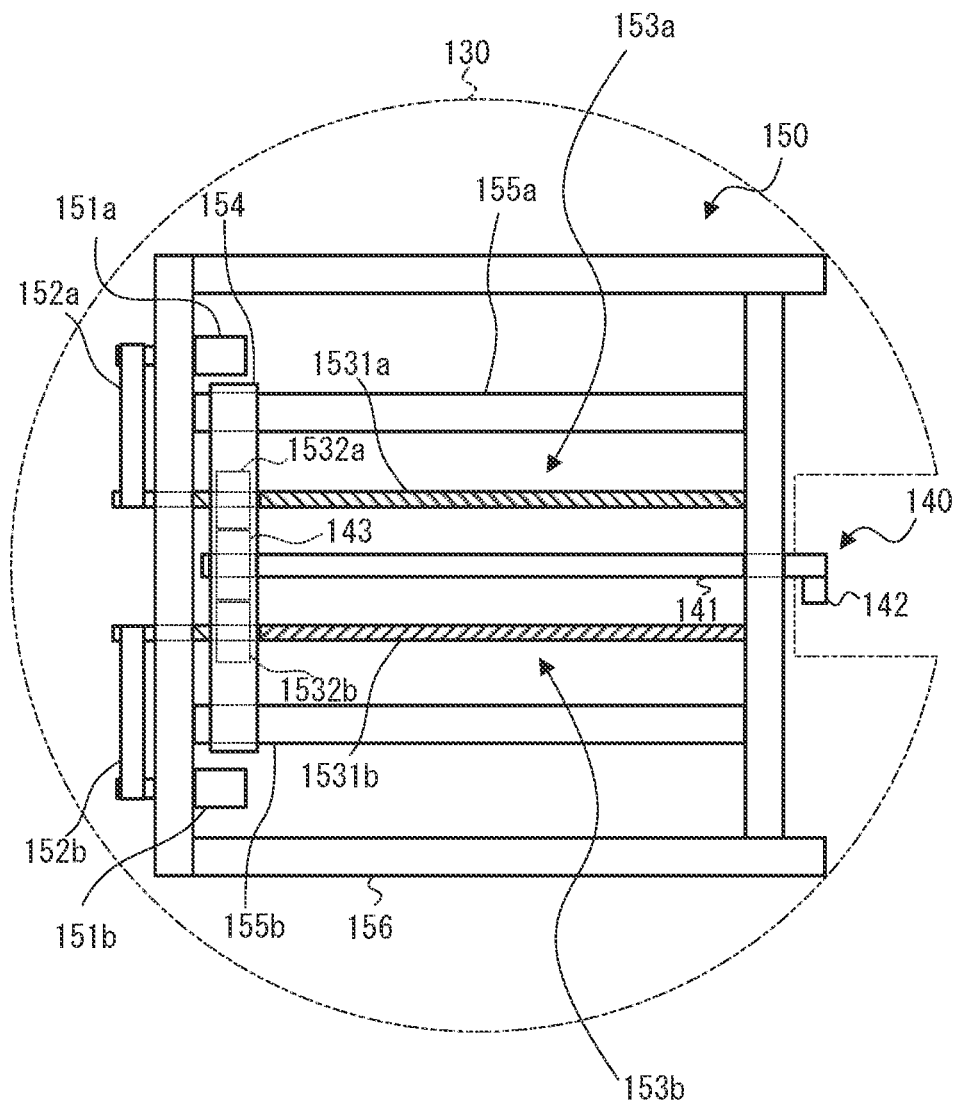
FIG. 5B is a schematic diagram showing an example of the configuration of the driving mechanism.
Figure 5C:
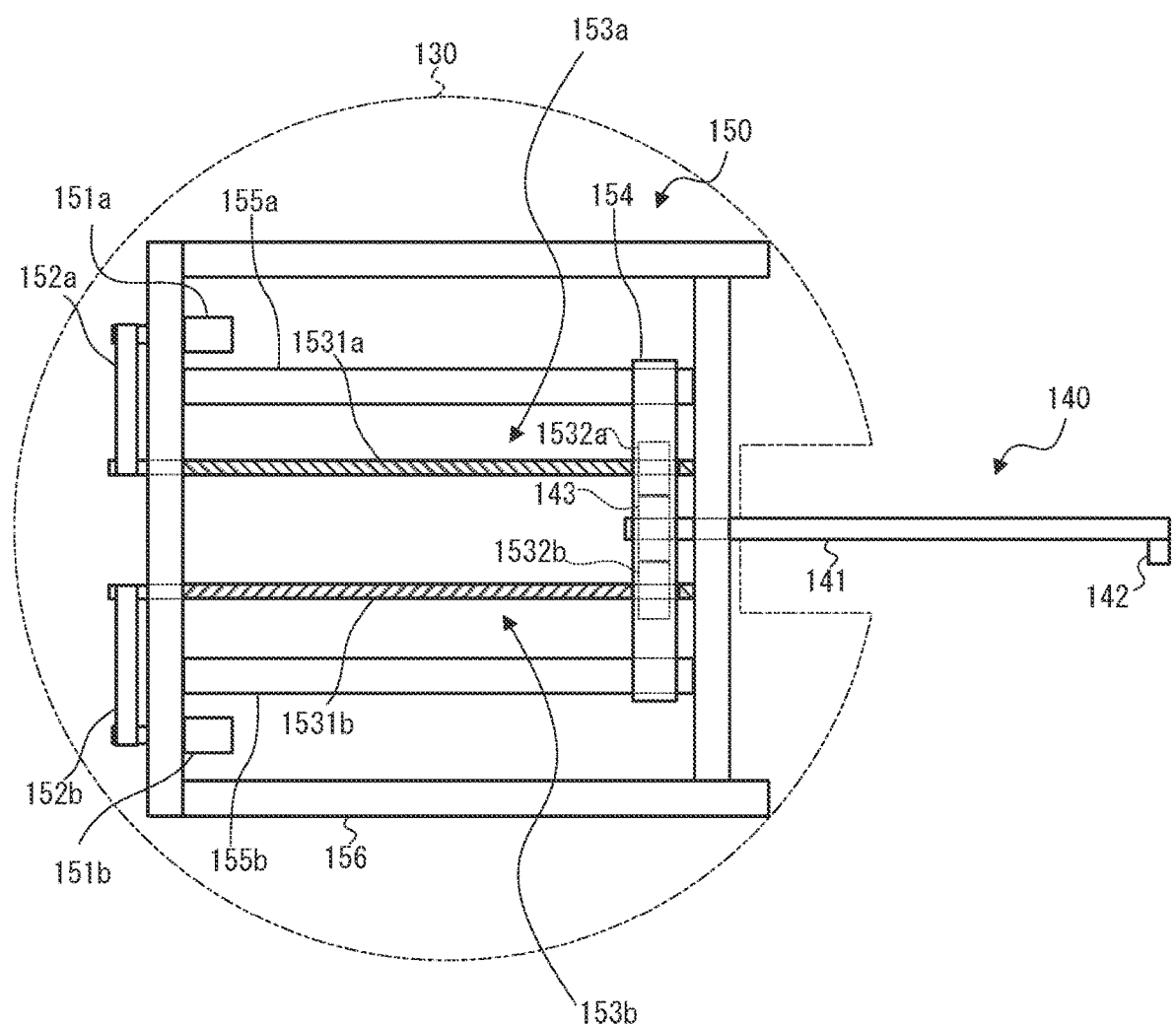
FIG. 5C is a schematic diagram showing an example of the configuration of the driving mechanism.

Next, the driving mechanism 150 in this embodiment will be described in detail. FIGS. 5A to 5C are schematic diagrams showing an example of the configuration of the driving mechanism 150. In particular, FIG. 5B is a schematic diagram showing a state in which the tip of the arm 140 is retracted as much as possible to the placement part 130 side, and FIG. 5C is a schematic diagram showing a state in which the tip of the arm 140 protrudes outward as much as possible in the horizontal direction of the placement part 130.

The driving mechanism 150 includes motors 151*a* and 151*b*, speed reducers 152*a* and 152*b*, ball screws 153*a* and 153*b*, a slider 154, rails 155*a* and 155*b*, and a support frame 156. The ball screws 153*a* and 153*b*, the rails 155*a* and 155*b*, and the shaft part 141 of the arm 140 are arranged in parallel to each other. In the example of the configuration shown in FIGS. 5A to 5C, the ball screws 153*a* and 153*b*, and the shaft part 141 of the arm 140 are arranged between the two rails 155*a* and 155*b*, and in particular are arranged in the order of the ball screw 153*a*, the shaft part 141, and the ball screw 153*b*. That is, the arm 140 is disposed between the ball screws 153*a* and 153*b*.

The ball screw 153*a* includes a screw shaft 1531*a* and a nut gear 1532*a*. In the nut gear 1532*a*, teeth by which the nut gear 1532*a* functions as a gear are formed on its outer peripheral surface. That is, the nut gear 1532*a* serves as a nut into which the screw shaft 1531*a* is screwed, and also serves as a gear. Similarly, the ball screw 153*b* includes a screw shaft 1531*b* and a nut gear 1532*b*. In the nut gear 1532*b*, teeth by which the nut gear 1532*b* functions as a gear are formed on its outer peripheral surface. That is, the nut gear 1532*b* serves as a nut into which the screw shaft 1531*b* is screwed, and also serves as a gear. Note that, in this embodiment, the directions of the threading of the screw shafts 1531*a* and 1531*b* are opposite to each other.

Further, a gear 143 is provided at an end of the arm 140 opposite to the end thereof at which the projection part 142 of the shaft part 141 is disposed. The shaft part 141 rotates as the gear 143 rotates. Inside the slider 154, the nut gear 1532*a* is engaged with the gear 143, and the gear 143 is engaged with the nut gears 1532*a* and 1532*b*. Further, the nut gear 1532*b* is engaged with the gear 143.

The slider 154 accommodates the nut gears 1532*a* and 1532*b* and the gear 143, and linearly moves (i.e., moves in a straight line) along the rails 155*a* and 155*b* by the rotations of the ball screws 153*a* and 153*b*. The arm 140 linearly moves (i.e., moves in a straight line) by the linear movement of the slider 154. The rails 155*a* and 155*b* and the screw shafts 1531*a* and 1531*b* penetrate the slider 154. Inside the slider 154, the nut gears 1532*a* and 1532*b* and the gear 143 are arranged side by side in a direction perpendicular to the shaft part 141 of the arm 140. As described above, the slider 154 accommodates the nut gears 1532*a* and 1532*b* and the gear 143, and moves in the direction of the shaft part 141 as the nut gears 1532a and 1532b move. As a result, the shaft part 141 also moves. The rails 155a and 155b are rod-like members arranged in parallel with the ball screws 153a and 153b. Further, the support frame 156 is a frame for supporting each of the components of the driving mechanism 150.

Each of the motors 151a and 151b is driven according to a control signal sent from the control unit 100. As the motor 151a rotates, the ball screw 153a, which is connected to the motor 151a through the speed reducer 152a, rotates. Similarly, as the motor 151b rotates, the ball screw 153b, which connected to the motor 151b through the speed reducer 152b, rotates. Each of the speed reducers 152a and 152b is composed of, for example, a belt(s) and a pulley(s).

In this embodiment, the control unit 100 controls the movement of the arm 140 by controlling the rotations of the screw shafts 1531a and 1531b by using the motors 151a and 151b. Specifically, when the arm 140 is extended toward the outside of the placement part 130, the control unit 100 rotates the screw shaft 1531a in a first rotation direction and rotates the screw shaft 1531b in a second rotation direction opposite to the first rotation direction. The directions of the threading of the screw shafts 1531a and 1531b are opposite to each other as described above. Therefore, by the above-described rotations of the screw shafts 1531a and 1531b, the slider 154 linearly moves in the direction in which the arm 140 is extended. Similarly, when the arm 140 is returned (i.e., retracted), the control unit 100 rotates the screw shaft 1531a in the second rotation direction and rotates the screw shaft 1531b in the first rotation direction. By the above-described rotations of the screw shafts 1531a and 1531b, the slider 154 linearly moves in the direction in which the arm 140 is returned (i.e., retracted).

In contrast, when the projection part 142 of the arm 140 is rotated in the first rotation direction, the control unit 100 rotates both the screw shafts 1531a and 1531b in the second rotation direction opposite to the first rotation direction. The directions of the threading of the screw shafts 1531a and 1531b are opposite to each other as described above. Therefore, when the screw shafts 1531a and 1531b rotate in the same direction, instead of causing the linear movement of the slider 154, the nut gears 1532a and 1532b rotate in the same direction as the rotation direction of the screw shafts 1531a and 1531b. As a result, the gear 143 of the arm 140 rotates in the first rotation direction, and the projection part 142 also rotates in the first rotation direction. Similarly, when the projection part 142 of the arm 140 is rotated in the second rotation direction, the control unit 100 rotates both the screw shafts 1531a and 1531b in the first rotation direction. As a result, the gear 143 of the arm 140 rotates in the second rotation direction, and the projection part 142 also rotates in the second rotation direction.

Figure 6:
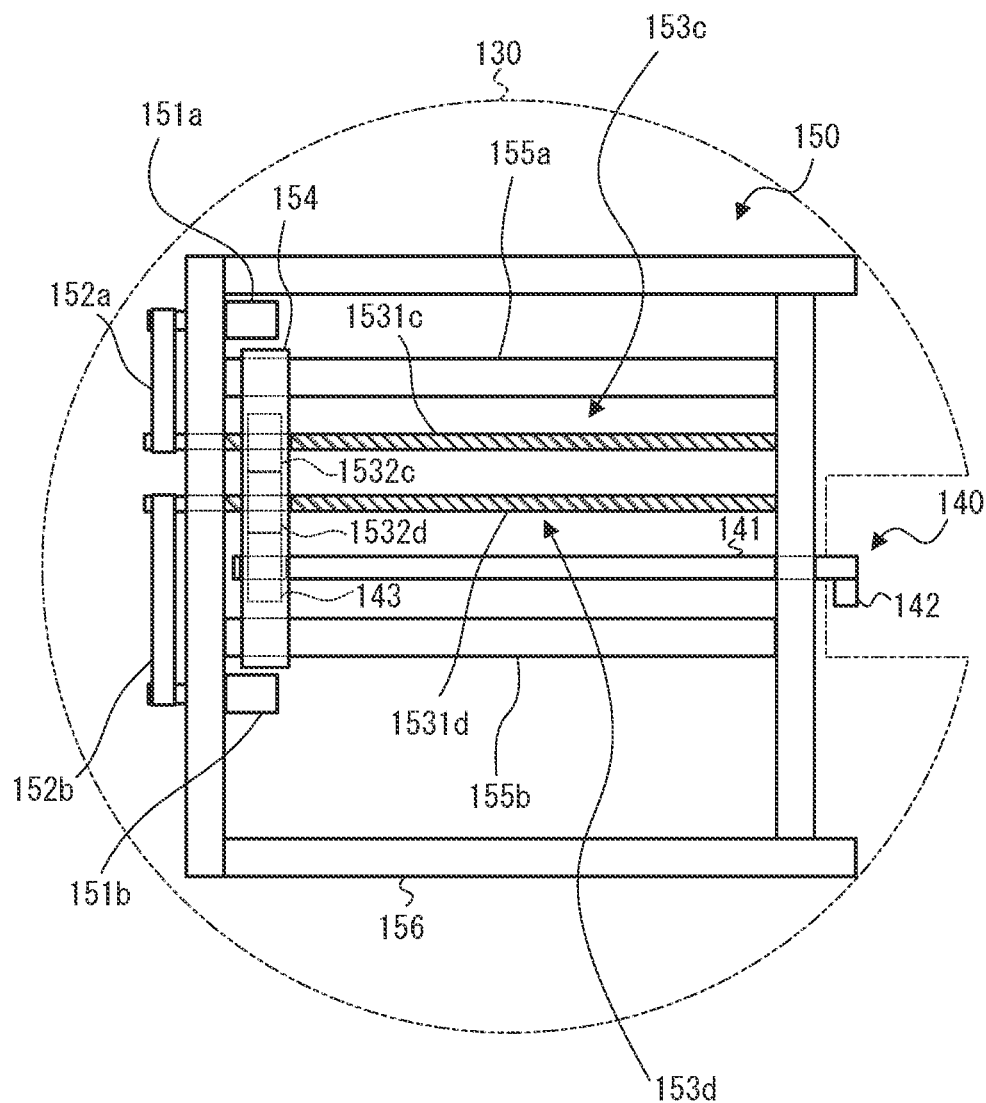
FIG. 6 is a schematic diagram showing a modified example of the configuration of the driving mechanism.

Note that although the shaft part 141 of the arm 140 is disposed between the ball screws 153a and 153b, of which the directions of the threading are opposite to each other, in this embodiment, the below-described modified example is also conceivable. FIG. 6 is a schematic diagram showing a modified example of the driving mechanism 150 for the arm 140. The driving mechanism 150 for the arm 140 shown in FIG. 6 differs from the driving mechanism 150 shown in FIGS. 5A to 5C in the following points. In the driving mechanism 150 shown in FIG. 6, ball screws 153c and 153d are used instead of using the ball screws 153a and 153b. Further, in the driving mechanism 150 shown in FIG. 6, the arrangement of the ball screws 153c and 153d and the shaft part 141 of the arm 140 is changed from that in the driving mechanism 150 shown in FIGS. 5A to 5C.

The ball screws 153c and 153d are different from the ball screws 153a and 153b because the directions of the threading of the ball screws 153c and 153d are the same as each other. In particular, the ball screw 153c includes a screw shaft 1531c and a nut gear 1532c. Similarly, the ball screw 153d includes a screw shaft 1531d and a nut gear 1532d. Further, the directions of the threading of the screw shafts 1531c and 1531d are the same as each other.

Further, the ball screws 153c and 153d and the shaft part 141 of the arm 140 are arranged in the order of the ball screw 153a, the ball screw 153b, and the shaft part 141 of the arm 140. That is, the arm 140 is disposed outside the two ball screws 153c and 153d arranged in parallel to each other. Therefore, inside the slider 154, the nut gear 1532c is engaged with the nut gear 1532d, and the nut gear 1532d is engaged with the nut gear 1532c and the gear 143. Further, the gear 143 is engaged with the nut gear 1532d.

Note that, similarly to the driving mechanism 150 shown in FIGS. 5A to 5C, the ball screws 153c and 153d are arranged in parallel with the shaft part 141 of the arm 140. The ball screw 153c is rotated by a motor 151a. Similarly, the ball screw 153d is rotated by a motor 151b.

For the driving mechanism 150 having the above-described configuration, the control unit 100 controls the movement of the arm 140 by controlling the rotations of the screw shafts 1531a and 1531b by using the motors 151a and 151b as described below. Specifically, when the arm 140 is extended toward the outside of the placement part 130, the control unit 100 rotates both the screw shafts 1531c and 1531d in a first rotation direction. By the above-described rotations of the screw shafts 1531c and 1531d, the slider 154 linearly moves in the direction in which the arm 140 is extended. Similarly, when the arm 140 is returned (i.e., retracted), the control unit 100 rotates both the screw shafts 1531c and 1531d in a second rotation direction opposite to the first rotation direction. By the above-described rotations of the screw shafts 1531c and 1531d, the slider 154 linearly moves in the direction in which the arm 140 is returned (i.e., retracted).

In contrast, when the projection part 142 of the arm 140 is rotated in the first rotation direction, the control unit 100 rotates the screw shaft 1531c in the first rotation direction and rotates the screw shaft 1531d in the second rotation direction opposite to the first rotation direction. The directions of the threading of the screw shafts 1531c and 1531d are the same as each other as described above. Therefore, when the screw shafts 1531c and 1531d rotate in the directions opposite to each other, instead of causing the linear movement of the slider 154, the nut gear 1532c rotates in the same direction as the rotation direction of the screw shaft 1531c and the nut gear 1532d rotates in the same direction as the rotation direction of the screw shaft 1531d. As a result, the gear 143 of the arm 140 rotates in the first rotation direction, and the projection part 142 also rotates in the first rotation direction. Similarly, when the projection part 142 of the arm 140 is rotated in the second rotation direction, the control unit 100 rotates the screw shaft 1531c in the second rotation direction and rotates the screw shaft 1531d in the first rotation direction. As a result, the gear 143 of the arm 140 rotates in the second rotation direction, and the projection part 142 also rotates in the second rotation direction.

As described above, the driving mechanism 150 includes two ball screws 153a and 153b (or 153c and 153d), and the gear 143 provided in the shaft part 141 of the arm 140 is engaged with at least one of the nut gears of the two ball screws. Further, the control unit 100 controls the movement of the arm 140 by controlling the rotation direction of each of the ball screws. By the above-described configuration, it is possible to linearly move and rotate the arm 140 by a simple configuration.

The radio communication unit 160 is a circuit that performs radio communication in order to communicate with a server or another robot as required, and includes, for example, a radio transmitting/receiving circuit and an antenna. Note that when the autonomous mobile robot 10 does not communicate with other apparatuses, the radio communication unit 160 may be omitted.

The control unit 100 is an apparatus that controls the autonomous mobile robot 10, and includes a processor 101, a memory 102, and an interface 103. The processor 101, the memory 102, and the interface 103 are connected to one another through a data bus or the like.

The interface 103 is an input/output circuit that is used to communicate with other apparatuses such as the moving part 110, the expandable part 120, the driving mechanism 150, and the radio communication unit 160.

The memory 102 is formed by, for example, a combination of a volatile memory and a nonvolatile memory. The memory 102 is used to store software (a computer program) including at least one instruction executed by the processor 101, and data used for various types of processing performed in the autonomous mobile robot 10.

The processor 101 loads the software (the computer program) from the memory 102 and executes the loaded software, and by doing so, performs processing performed by the control unit 100 as described later.

The processor 101 may be, for example, a microprocessor, an MPU (Micro Processor Unit), or a CPU (Central Processing Unit). The processor 101 may include a plurality of processors.

As described above, the control unit 100 is an apparatus that functions as a computer.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Next, processing performed by the control unit 100 will be described.

The control unit 100 controls the movement of the autonomous mobile robot 10. That is, the control unit 100 controls the movements of the moving part 110, the expandable part 120, and the arm 140. The control unit 100 controls the rotation of each of the driving wheels 112 by transmitting a control signal to each of the motors 114 of the moving part 110, and therefore can move the robot main-body 111 to an arbitrary place. Further, the control unit 100 can control the height of the placement part 130 by transmitting a control signal to the driving unit 121 of the expandable part 120. Further, the control unit 100 can control the movement of the arm 140 in the horizontal direction and the rotation of the projection part 142 by transmitting a control signal(s) to the driving mechanism 150.

The control unit 100 may control the movement of the autonomous mobile robot 10 by performing well-known control such as feedback control and robust control based on information about the rotations of the driving wheels 112 detected by a rotation sensor(s) provided in the driving wheels 112. Further, the control unit 100 may make the autonomous mobile robot 10 move autonomously by controlling the moving part 110 based on information such as information about a distance(s) detected by a distance sensor such as a camera or an ultrasonic sensor provided in the autonomous mobile robot 10 and information about a map of the moving environment.

Figure 7:
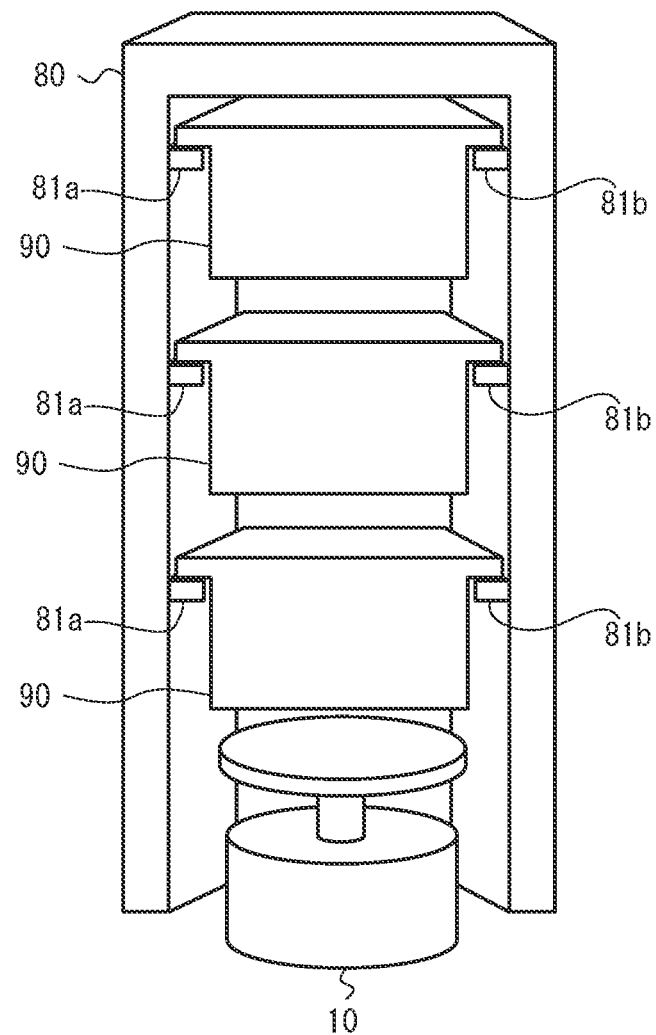
FIG. 7 is a schematic diagram showing a rack and objects to be conveyed, stored in the rack.
Figure 8:
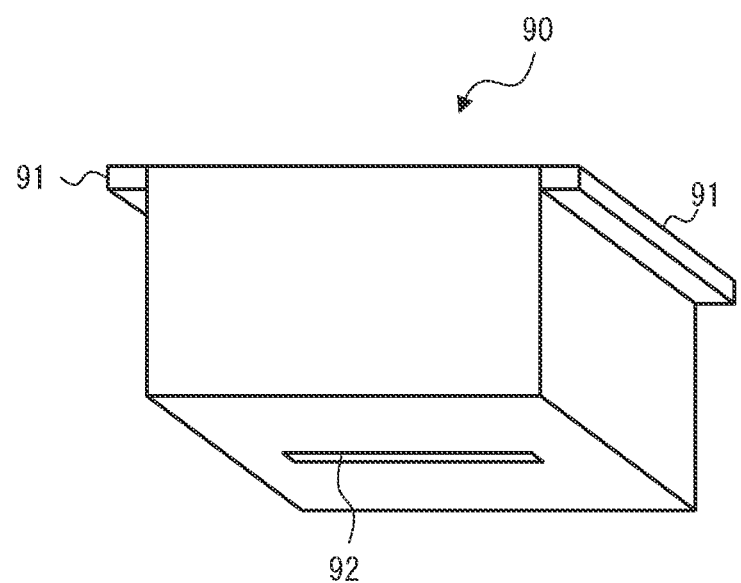
FIG. 8 is a perspective view showing the front, the bottom, and a side of an object.

An object that is conveyed by the autonomous mobile robot 10 will be described hereinafter in detail. FIG. 7 is a schematic diagram showing a rack 80 and objects 90 to be conveyed, stored in the rack 80. Note that, in FIG. 7, an autonomous mobile robot 10, which is positioned in front of the rack 80, is also shown. Further, FIG. 8 is a perspective view showing the front, the bottom, and a side of one of the objects 90. As shown in FIG. 7, the autonomous mobile robot 10 moves to a place close to the rack 80 when it moves an object 90 stored in the rack 80 onto the placement part 130 or when it moves an object 90 placed on the placement part 130 into the rack 80. More specifically, for example, the autonomous mobile robot 10 moves to a place that is located in front of the rack 80 and between a pair of rails 81a and 81b of the rack 80.

The rack 80 includes the pair of rails 81a and 81b that support both sides of the object 90. The pair of rails 81a and 81b are disposed at the same height and are parallel to each other. One of the sides of the object 90 stored in the rack 80 is supported by the rail 81a, and the other side thereof is supported by the rail 81b. Each of the rails 81a and 81b extends from the front of the rack 80 to the rear thereof.

For example, as shown in FIG. 8, flanges 91 are provided on both sides of the object 90, and the flanges 91 are supported by the rails 81a and 81b from underneath thereof, so that the object 90 is supported in the rack 80. Note that the flanges 91 are provided on both sides of the object 90 and extend from the front of the object 90 to the rear thereof. Although the flanges 91 are provided in the upper parts of the object 90 on the sides thereof in the example shown in FIG. 8, they do not necessarily have to be disposed in the upper parts of the object 90 and may be provided, for example, in the lower parts of the object 90. Further, in the case where the bottom surface of the object 90 is supported by the rails 81a and 81b, the flanges 91 do not necessarily have to be provided in the object 90.

As described above, in the rack 80, both sides of the object 90 are supported from underneath thereof by the rails 81a and 81b. Further, the object 90 is movable in the forward/backward direction along the rails 81a and 81b in the rack 80. That is, the object 90 is stored into the rack 80 by pushing the object 90 toward the rear surface of the rack 80. Further, the object 90 can be taken out from the rack 80 by pulling the object 90 toward and beyond the front of the rack 80.

As shown in FIG. 8, a groove 92, in which the projection part 142 of the arm 140 is hooked, is formed in a predetermined place in the bottom surface of the object 90. Note that the object 90 is, for example, a rectangular parallelepiped container, but it is not limited to this example and may be any type of an object. Any object can be stored in the object 90 which serves as a container.

Figure 9A:
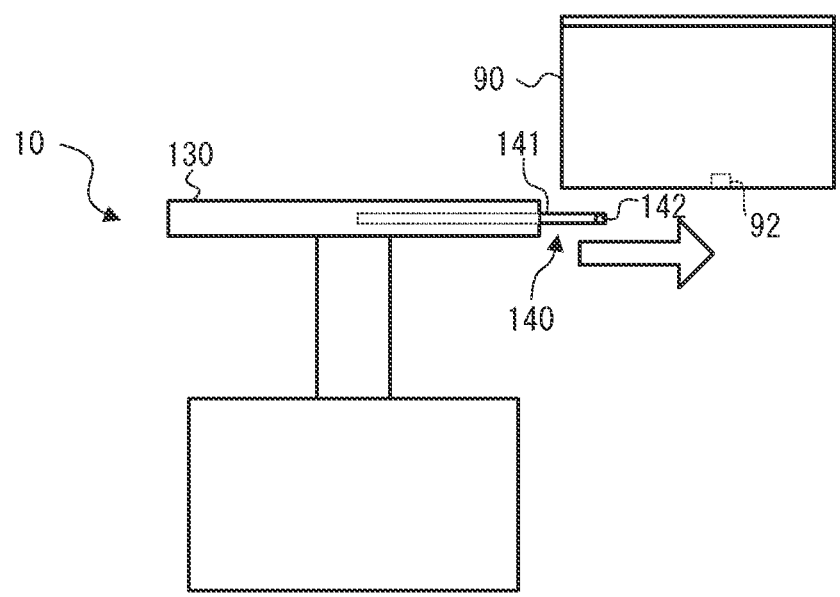
FIG. 9A is a schematic diagram showing a movement of an object originally stored into a rack through which the object is placed on a placement part.
Figure 9B:
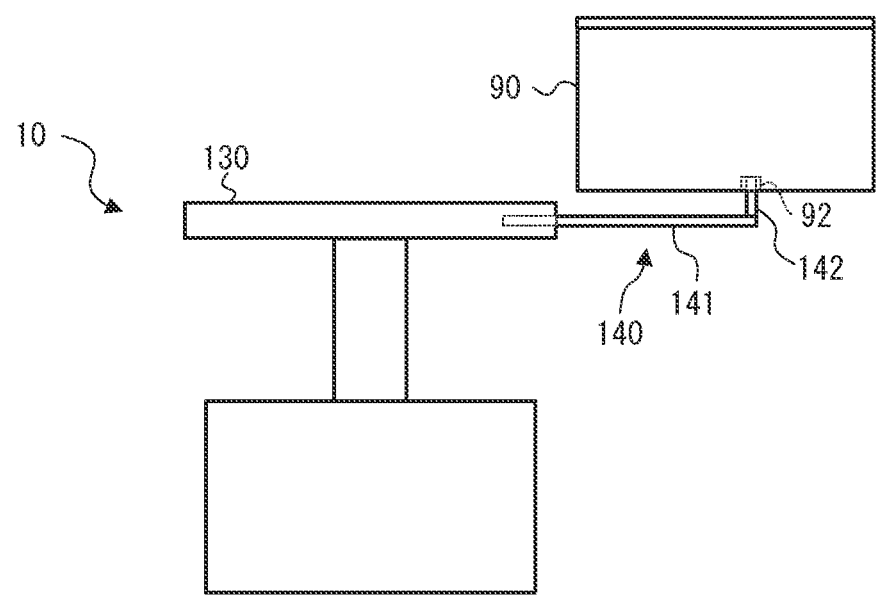
FIG. 9B is a schematic diagram showing the movement of the object originally stored into the rack through which the object is placed on the placement part.
Figure 9C:
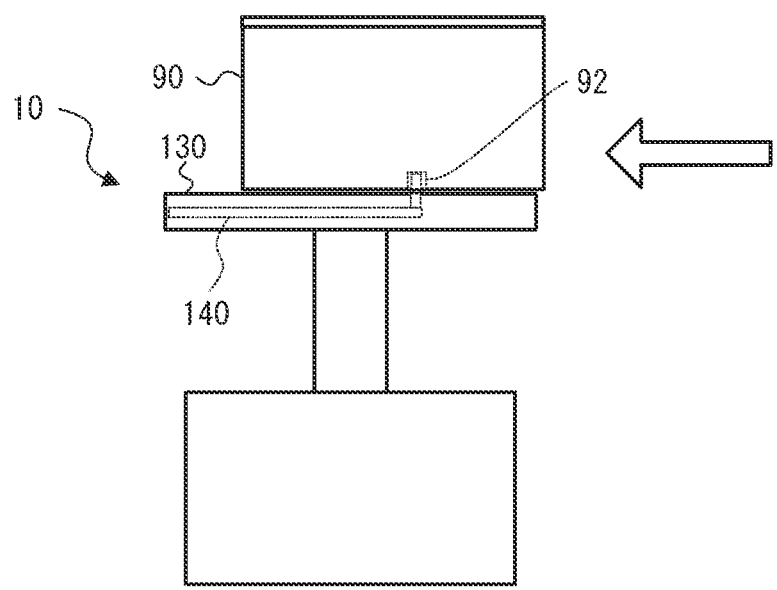
FIG. 9C is a schematic diagram showing the movement of the object originally stored into the rack through which the object is placed on the placement part.

By operating the arm 140, the control unit 100 of the autonomous mobile robot 10 moves the object 90 from the rack 80 onto the placement part 130, or moves the object 90 from the placement part 130 into the rack 80. FIGS. 9A to 9C are schematic diagrams showing movements of the object 90 originally stored in the rack 80 through which the object 90 is placed on the placement part 130.

As shown in FIG. 9A, firstly, the control unit 100 extends the arm 140 from the placement part 130 by a predetermined length, and thereby moves the tip of the arm (the projection part 142) toward the groove 92 formed in the bottom surface of the object 90. Note that in order to insert the arm 140 into a narrow space present on the bottom side of the object 90 to be conveyed (e.g., a narrow gap between the object 90 to be conveyed and another object 90 stored one level below the object 90 to be conveyed), the projection part 142 is orientated so as to project in the horizontal direction.

Next, as shown in FIG. 9B, the control unit 100 rotates the projection part 142 by using the shaft part 141 of the arm 140 as the rotation shaft. Specifically, the control unit 100 rotates the projection part 142 so that the projection part 142 points upward. In this way, the projection part 142 enters the groove 92 formed in the object 90. As described above, in this embodiment, it is possible, by rotating the projection part 142, to easily switch the state of the arm 140 between a state in which the tip of the arm 140 is hooked in the groove and a state in which the tip of the arm 140 is not hooked in the groove.

Next, as shown in FIG. 9C, the control unit 100 returns the tip (the projection part 142) of the arm 140 hooked in the groove 92 toward the placement part 130. As a result, the object 90 is pulled out from the rack and moved from the rack onto the placement part 130.

Further, the control unit 100 can store an object 90 placed on the placement part 130 into the rack by moving the tip of the arm 140 hooked in the groove 92 of the object 90 placed on the placement part 130 toward the rack, i.e., by extending the arm 140 from the placement part 130 by a predetermined length while keeping the projection part 142 hooked in the groove 92.

Note that, in this embodiment, the position of the groove 92 in the object 90 is determined beforehand. That is, the distance from the autonomous mobile robot 10 positioned in front of the rack to the groove 92 is determined beforehand. Therefore, in this embodiment, the control unit 100 extends the arm 140 from the placement part 130 by a length corresponding to this distance. However, for example, the autonomous mobile robot 10 may include a sensor such as a camera that detects the position of the groove 92 formed in the object 90. In such a case, the control unit 100 may determine, based on the result of the detection by the sensor, the length by which the control unit 100 extends the arm 140 from the placement part 130.

Note that when an object is moved between the placement part 130 and the rack, the height of the placement part 130 has already been adjusted to a height suitable for the movement of the object. That is, the control unit 100 performs control in advance so that the placement part 130 is positioned at a predetermined height. As described above, in this embodiment, the control unit 100 performs control to change the height of the placement part 130. Therefore, it is possible to move an object from the rack onto the placement part 130, or move an object from the placement part 130 into the rack at an arbitrary height. For example, when an object stored into the rack is moved onto the placement part 130, the control unit 100 adjusts the height of the placement part 130 so that the height of the upper surface of the placement part 130 falls within a range from a first height to a second height. Note that the first height is the height of the bottom surface of the object in the state in which the object is stored in the rack, and the second height is a height that defines a permissible range of the difference between the height of the upper surface of the placement part 130 and the height of the bottom surface of the object, and is a height a predetermined length lower than the first height. Similarly, when an object placed on the placement part 130 is stored into the rack, the control unit 100 adjusts the height of the placement part 130 so that the height of the upper surface of the placement part 130 falls within a range from a third height to a fourth height. Note that the third height is the height of the bottom surface of the object in the state in which the object is stored in the rack, and the fourth height is a height that defines a permissible range of the difference between the height of the upper surface of the placement part 130 and the height of the bottom surface of the object in the state in which the object is stored in the rack, and is a height a predetermined length higher than the third height. Note that the third height is, for example, a height already known to the control unit 100.

Figure 10:
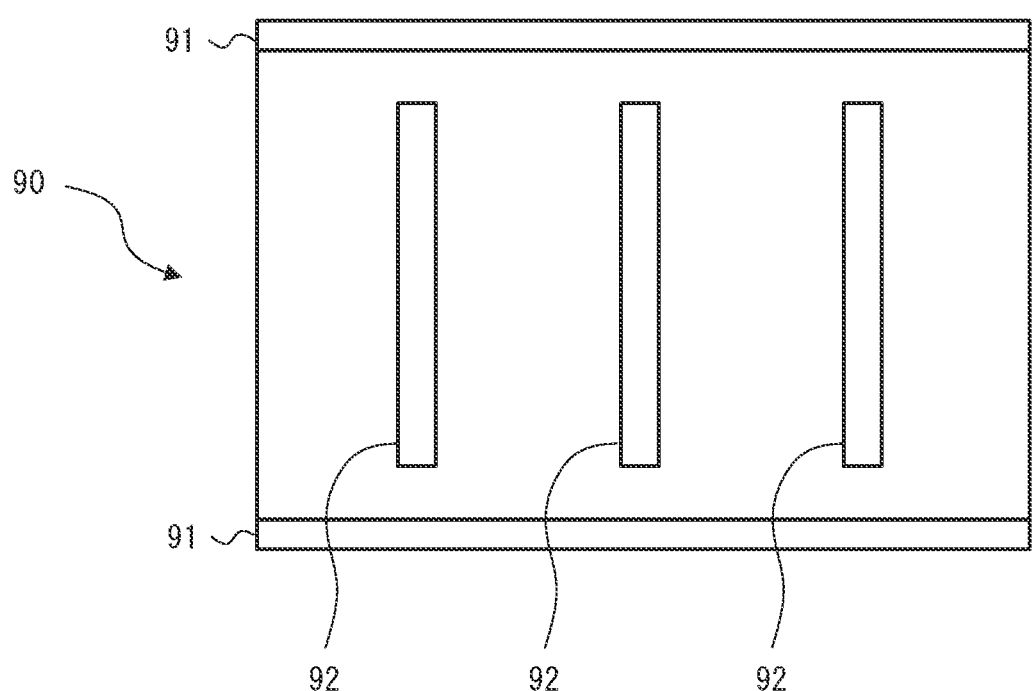
FIG. 10 is a bottom view of an object.

Note that only one groove 92 may be formed in the object 90 as shown in FIG. 8, or a plurality of grooves may be formed as shown in FIG. 10. FIG. 10 is a bottom view of an object 90. Specifically, in the example shown in FIG. 10, in the bottom surface of the object 90, a plurality of grooves 92 are formed and arranged in a direction perpendicular to a direction perpendicular to the direction of both sides (i.e., are arranged in a direction parallel to the direction of both sides) of the object 90 on which the flanges 91 are provided, i.e., are arranged in the moving direction of the object 90. In this case, when the object 90 stored in the rack is moved onto the placement part 130, the control unit 100 of the autonomous mobile robot 10 may repeat operations for pulling the object 90 from the rack by hooking the tip of the arm 140 in the grooves 92 one after another, starting from the groove 92 closest to the placement part 130. That is, the control unit 100 first partially pulls out the object 90 from the rack by using the first groove 92 as viewed from the placement part 130 side, and then partially pulls out the object 90 again from the rack by using the second groove 92 as viewed from the placement part 130 side. The object 90 may be completely pulled out from the rack by repeating the above-described operations while changing the groove 92 in which the tip of the arm 140 is hooked. By the above-described configuration, it is possible to reduce the length of the arm 140. That is, it is possible, by providing a plurality of grooves in the object 90, to improve the flexibility of the design regarding the length of the shaft part 141 of the arm 140. Similarly, when the object 90 placed on the placement part 130 is moved into the rack, the control unit 100 of the autonomous mobile robot 10 may repeat operations for pushing the object 90 into the rack by hooking the tip of the arm 140 in the grooves 92 one after another, starting from the groove 92 closest to the rack.

Figure 11:
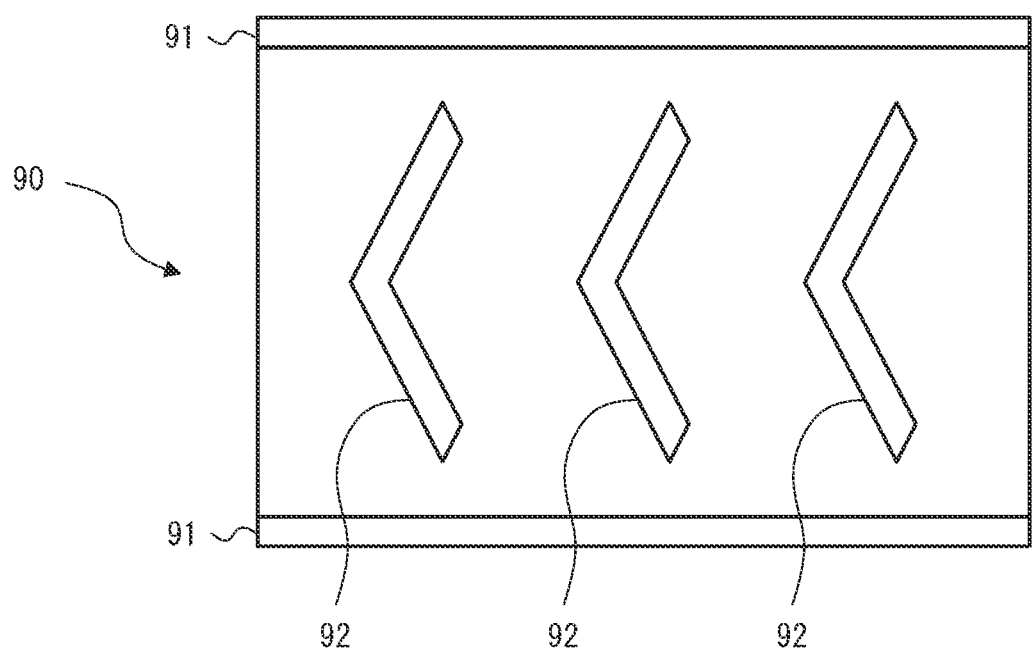
FIG. 11 is a bottom view of an object.

Further, although each of the grooves 92 has a rectangular shape extending in the direction perpendicular to the direction of both sides of the object 90 on which the flanges 91 are provided in the example shown in FIG. 10, the grooves 92 may have other shapes. For example, as shown in FIG. 11, each of the grooves 92 formed in the bottom surface of the object 90 may be a V-shaped slender groove having a predetermined width. More specifically, in the example shown in FIG. 11, each of the grooves 92 is formed so that the angular part (i.e., the apex) of the V-shape thereof points to a direction perpendicular to the direction perpendicular to the direction of both sides (i.e., points to a direction parallel to the direction of both sides) of the object 90 on which the flanges 91 are provided, i.e., points in the moving direction of the object 90. In this way, when the object is moved by the arm 140 with the tip thereof being hooked in the groove 92, the positional relation between the tip of the arm 140 and the object 90 is regulated. Therefore, it is possible to stabilize the movement of the object 90. Note that although a plurality of V-shaped grooves 92 are provided in the bottom surface of the object 90 in the example shown in FIG. 11, only one groove 92 may be provided in the bottom surface of the object 90.

Figure 12:
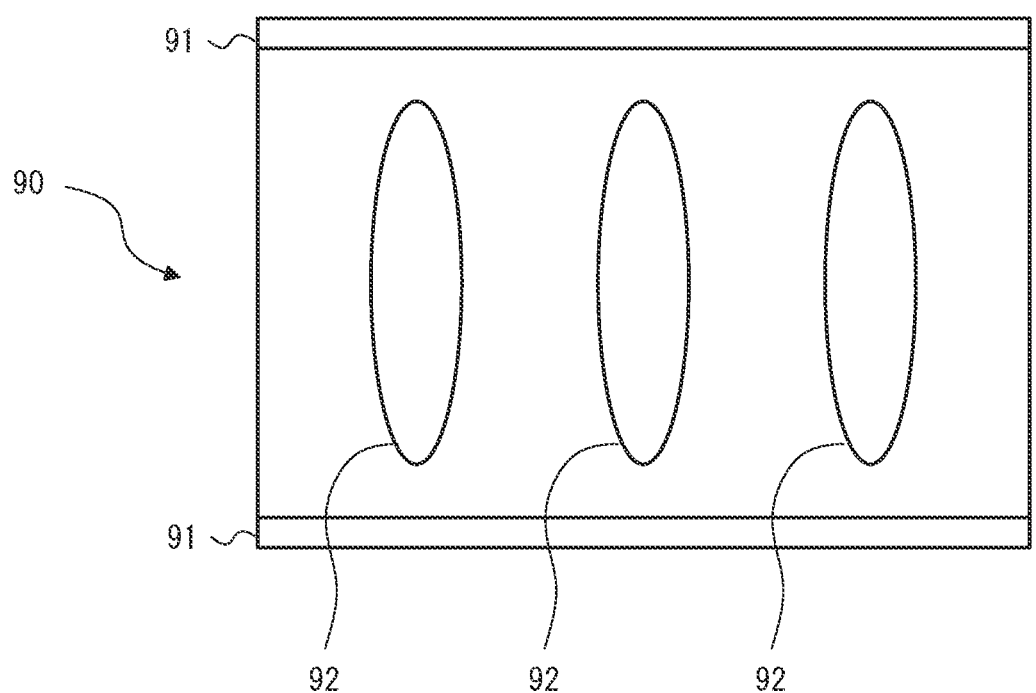
FIG. 12 is a bottom view of an object.
Figure 13:
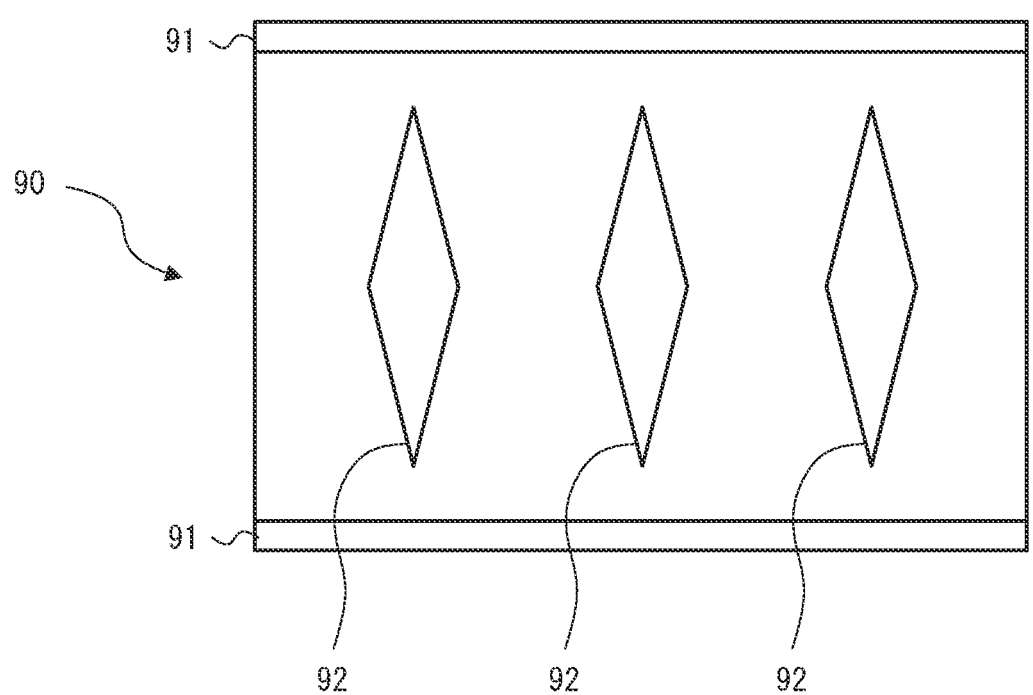
FIG. 13 is a bottom view of an object.

Further, each groove 92 may have an elliptical shape as shown in FIG. 12 or a rhombus shape as shown in FIG. 13. Further, the shape of the groove 92 is not limited to the elliptical shape, and may be a circular shape. In the case of such a shape, when the object 90 is moved by the arm 140 with the tip thereof being hooked in the groove 92, the positional relation between the tip of the arm 140 and the object 90 is regulated irrespective of whether the object is moved from the rack onto the placement part 130 or from the placement part 130 into the rack. Therefore, it is possible to stabilize the movement of the object 90 irrespective of whether the object 90 is moved from the rack onto the placement part 130 or from the placement part 130 into the rack. Note that only one groove 92 having an elliptical shape, a circular shape, or a rhombus shape may be formed.

Figure 14:
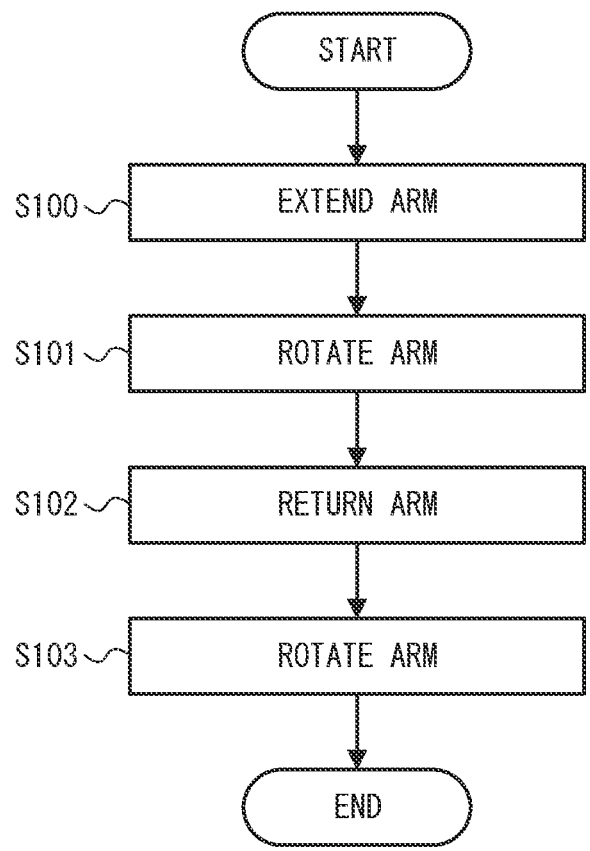
FIG. 14 is a flowchart showing an example of a flow of movements of an object from a rack to a placement part by an autonomous mobile robot according to an embodiment.

Next, movements of an object from the rack onto the placement part 130 by the autonomous mobile robot 10 will be described with reference to a flowchart. FIG. 14 is a flowchart showing an example of a flow of movements of an object from the rack onto the placement part 130 by the autonomous mobile robot 10. Note that it is assumed that the autonomous mobile robot 10 has already moved to a predetermined position in front of the rack.

In a step S100, the control unit 100 extends the arm 140 by a predetermined distance and thereby moves the tip of the arm toward a groove 92 formed in the bottom surface of an object.

Next, in a step S101, the control unit 100 rotates the arm 140. That is, the control unit 100 rotates the projection part 142 of the arm 140 so that the projection part 142 points upward. As a result, the projection part 142 enters the groove 92.

Next, in a step S102, the control unit 100 returns (i.e., retracts) the arm 140 by a predetermined distance. That is, the control unit 100 returns the tip of the arm 140 hooked in the groove 92 toward the placement part 130.

Next, in a step S103, the control unit 100 rotates the arm 140. That is, the control unit 100 rotates the projection part 142 of the arm 140 so that the projection part 142 points a direction other than the upward direction (e.g., points in a horizontal direction). As a result, the projection part 142 comes out of the groove 92. Note that in the case where the projection part 142 of the arm 140 does not need to be pulled out from the groove 92, the step S103 may be omitted (or skipped).

Through the above-described movements, the object is moved from the rack onto the placement part 130. However, in the case where a plurality of grooves 92 are formed in the bottom surface of the object as described above, the control unit 100 repeats the above-described operations from the step S100 to the step S103. After the object is placed on the placement part 130, the control unit 100 may control the moving part 110 so as to move to the destination.

Figure 15:
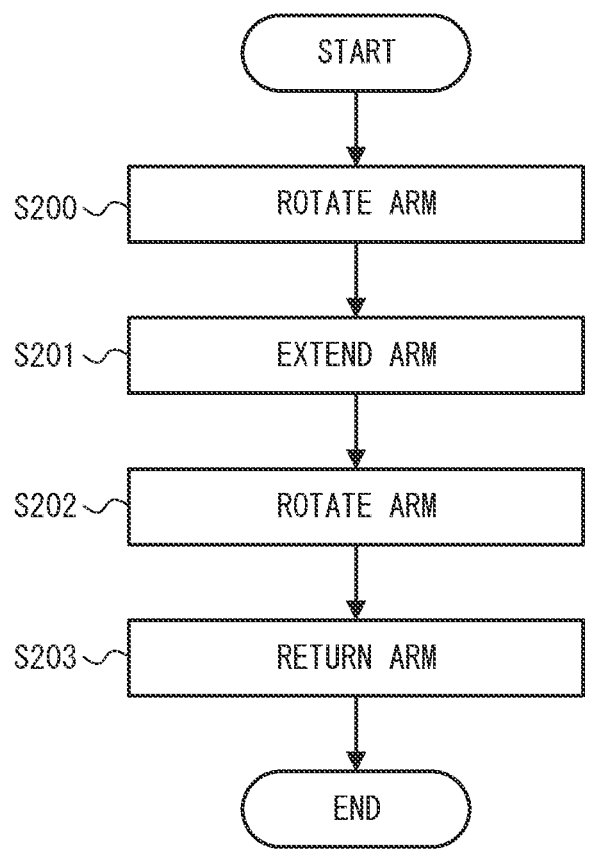
FIG. 15 is a flowchart showing an example of a flow of movements of an object from a placement part to a rack by the autonomous mobile robot according to the embodiment.
Figure 16A:
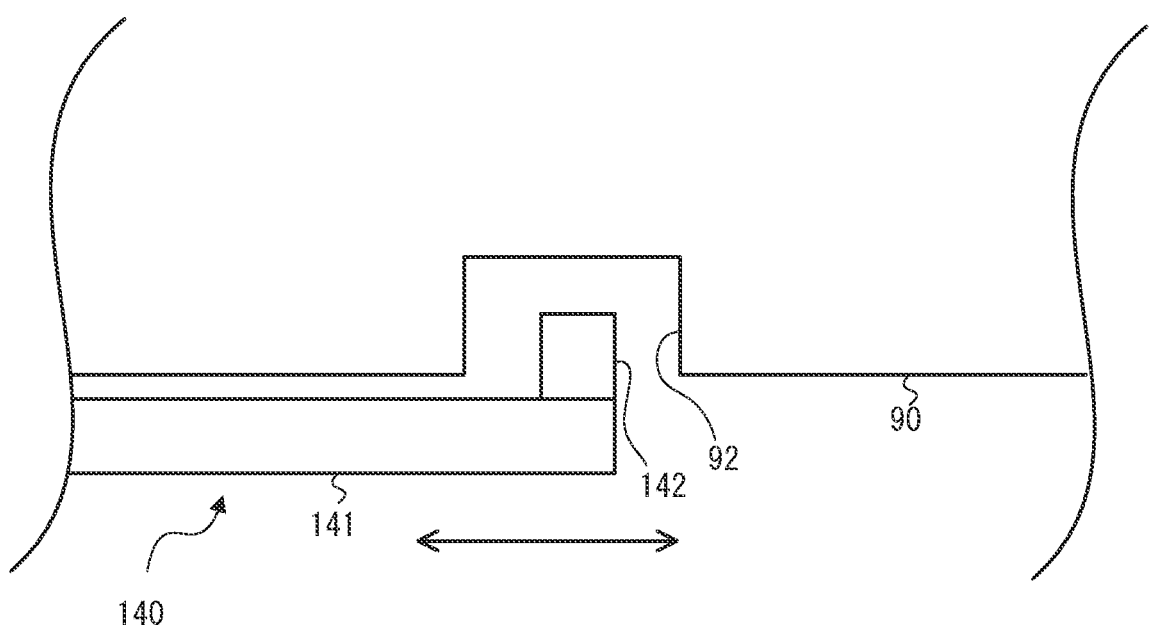
FIG. 16A is a schematic diagram showing a combination of shapes in which no upward internal force occurs at an object.
Figure 16B:
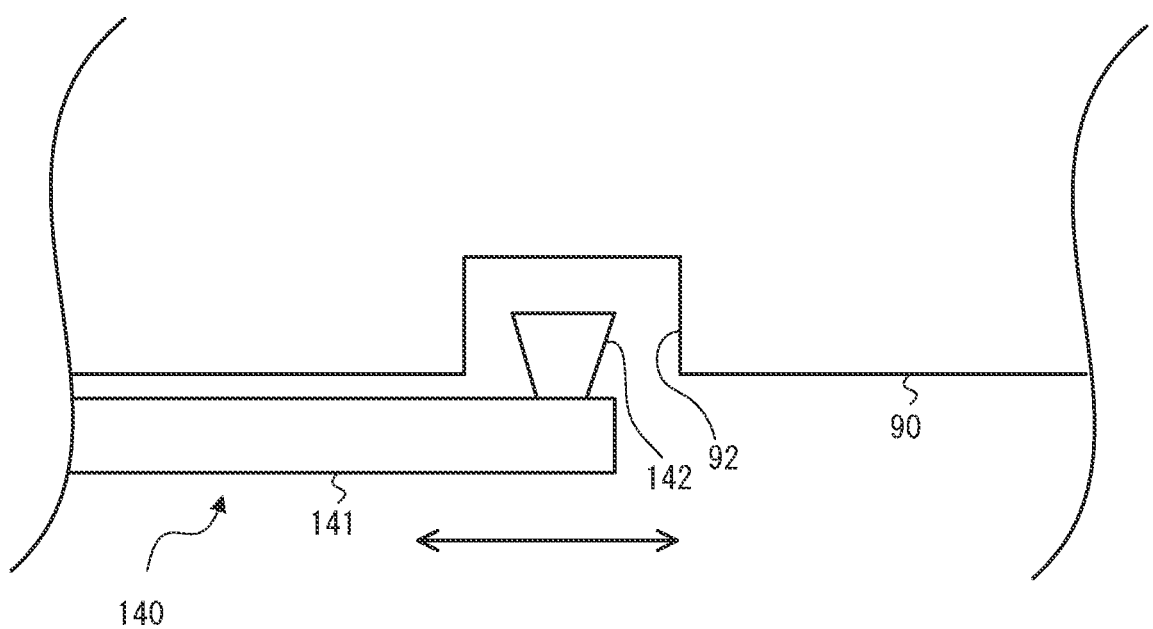
FIG. 16B is a schematic diagram showing a combination of shapes in which no upward internal force occurs at an object.
Figure 16C:
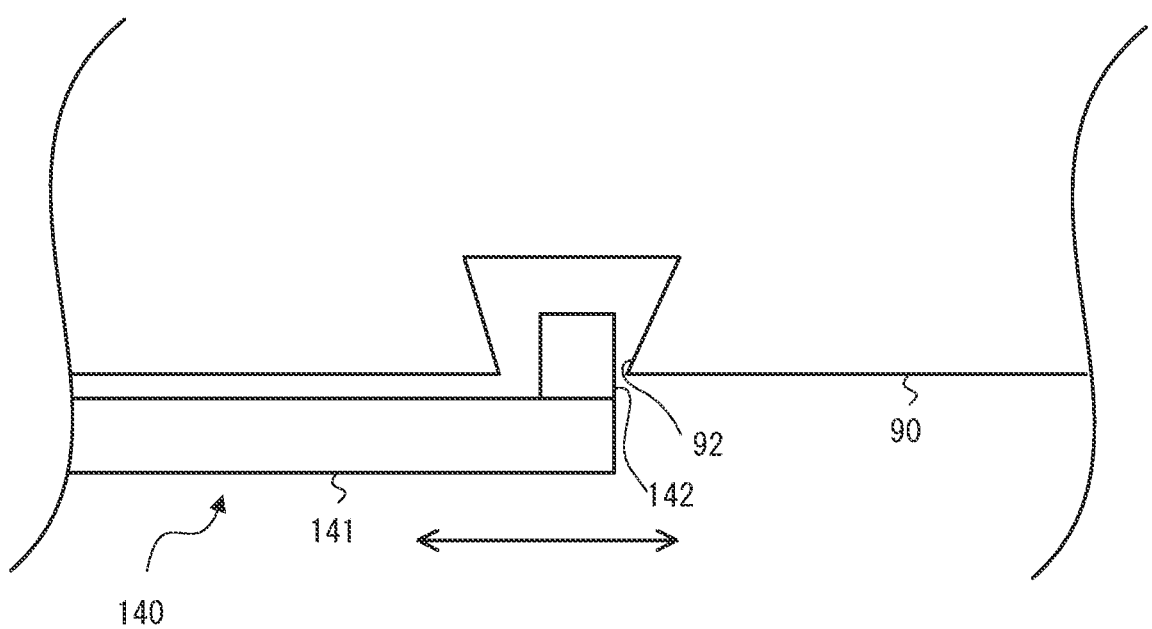
FIG. 16C is a schematic diagram showing a combination of shapes in which no upward internal force occurs at an object.
Figure 16D:
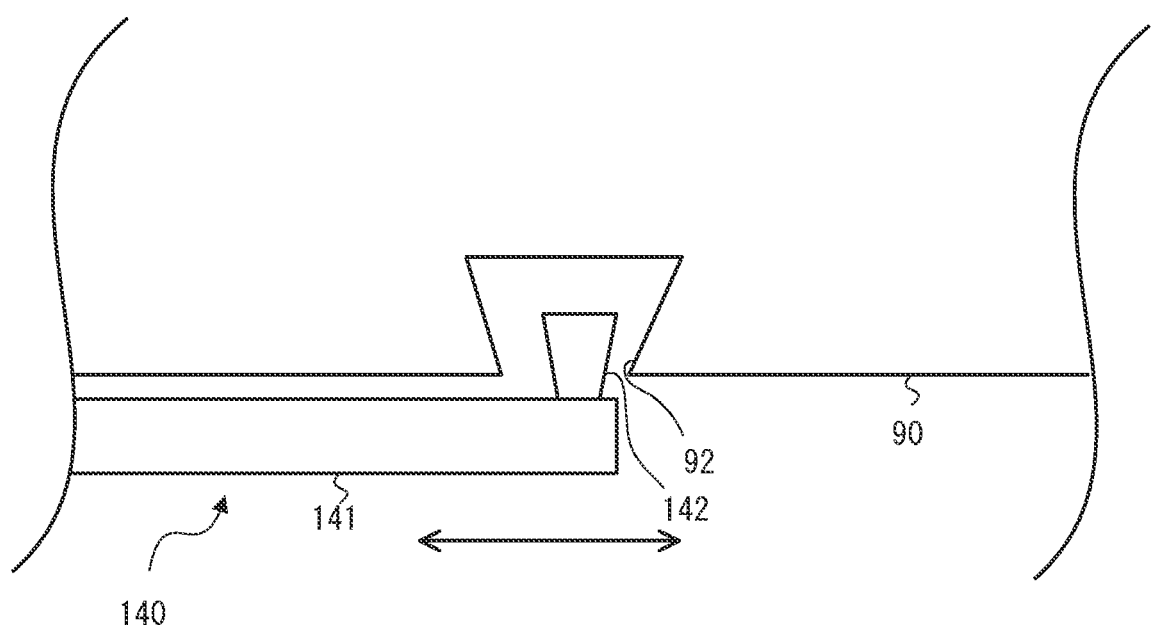
FIG. 16D is a schematic diagram showing a combination of shapes in which no upward internal force occurs at an object.
Figure 16E:
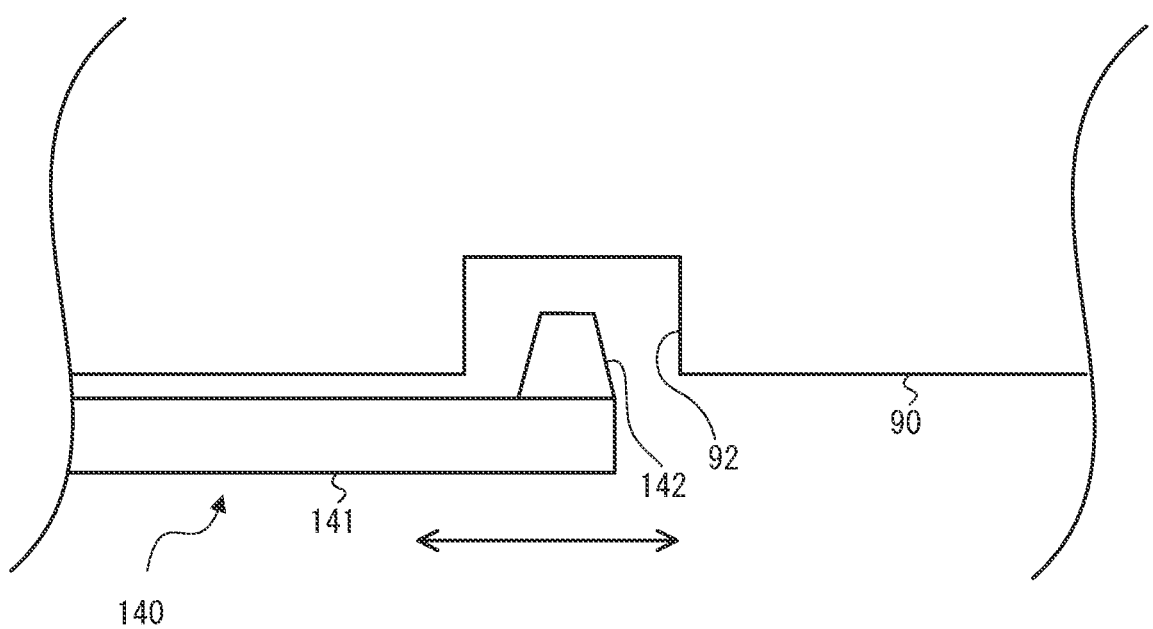
FIG. 16E is a schematic diagram showing a combination of shapes in which an upward internal force occurs at an object.
Figure 16F:
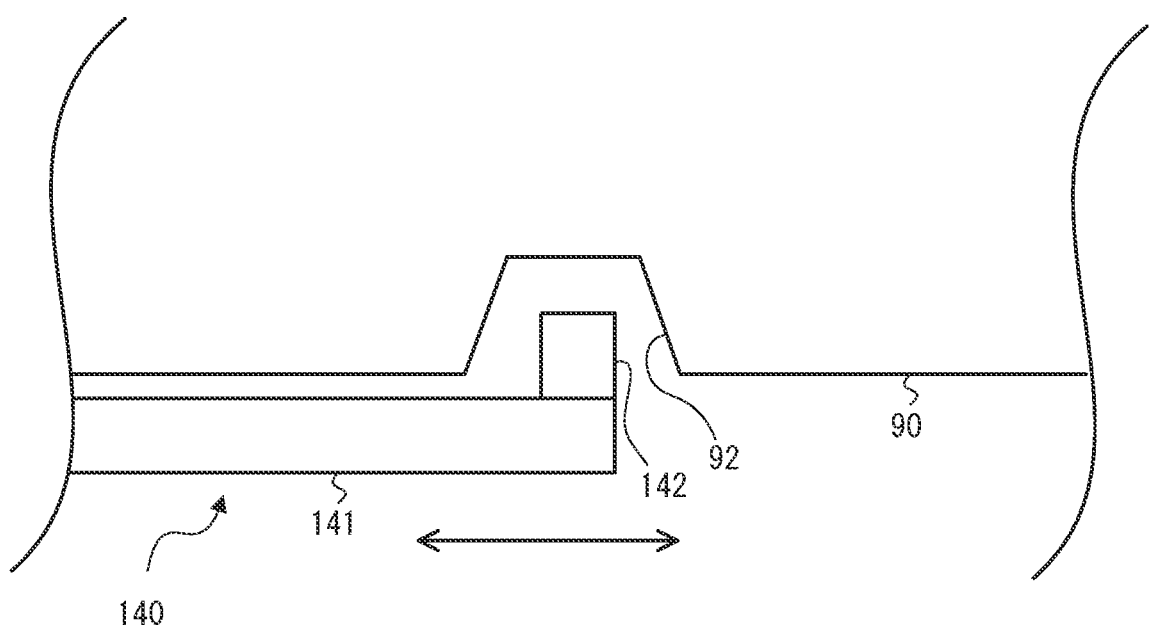
FIG. 16F is a schematic diagram showing a combination of shapes in which an upward internal force occurs at an object.
Figure 16G:
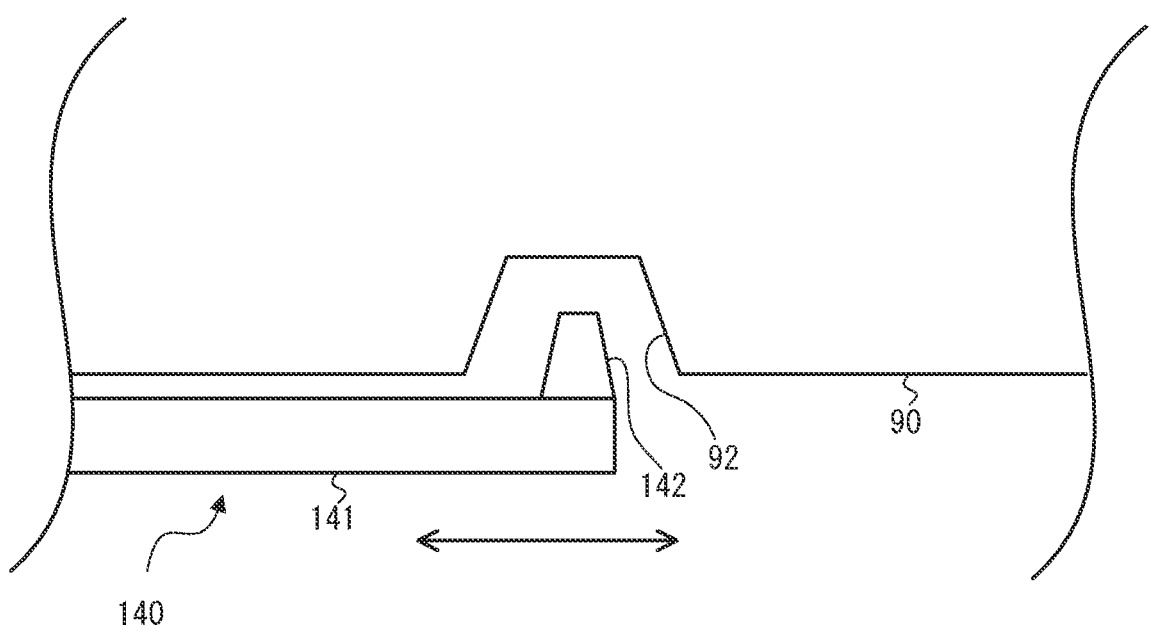
FIG. 16G is a schematic diagram showing a combination of shapes in which an upward internal force occurs at an object.
Figure 16H:
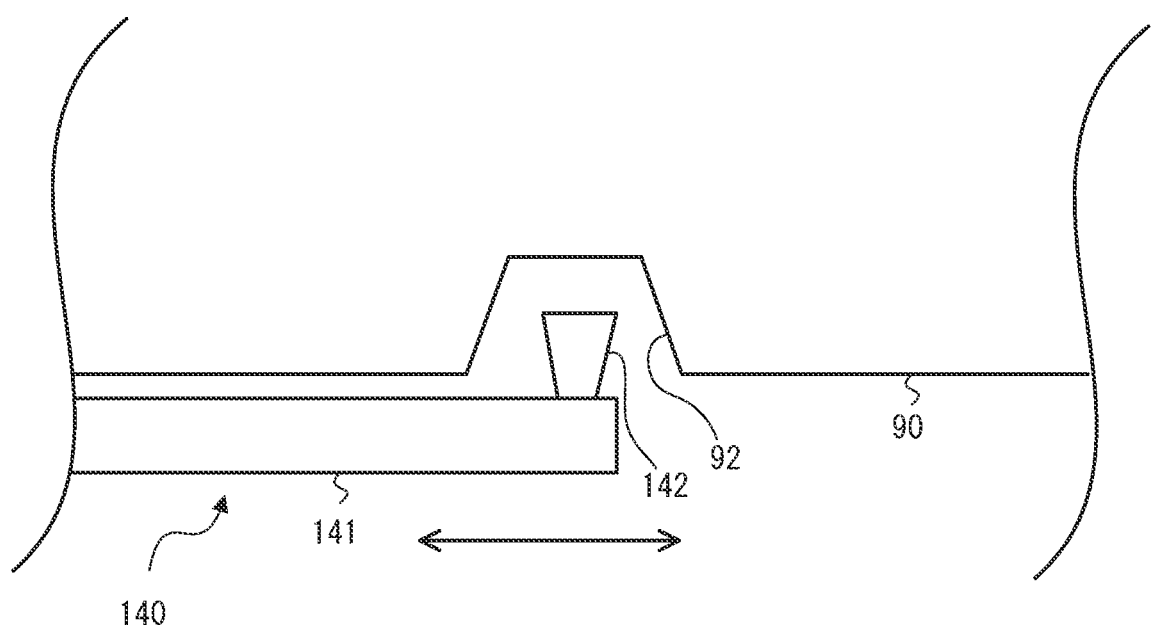
FIG. 16H is a schematic diagram showing a combination of shapes in which an upward internal force occurs at an object.
Figure 16I:
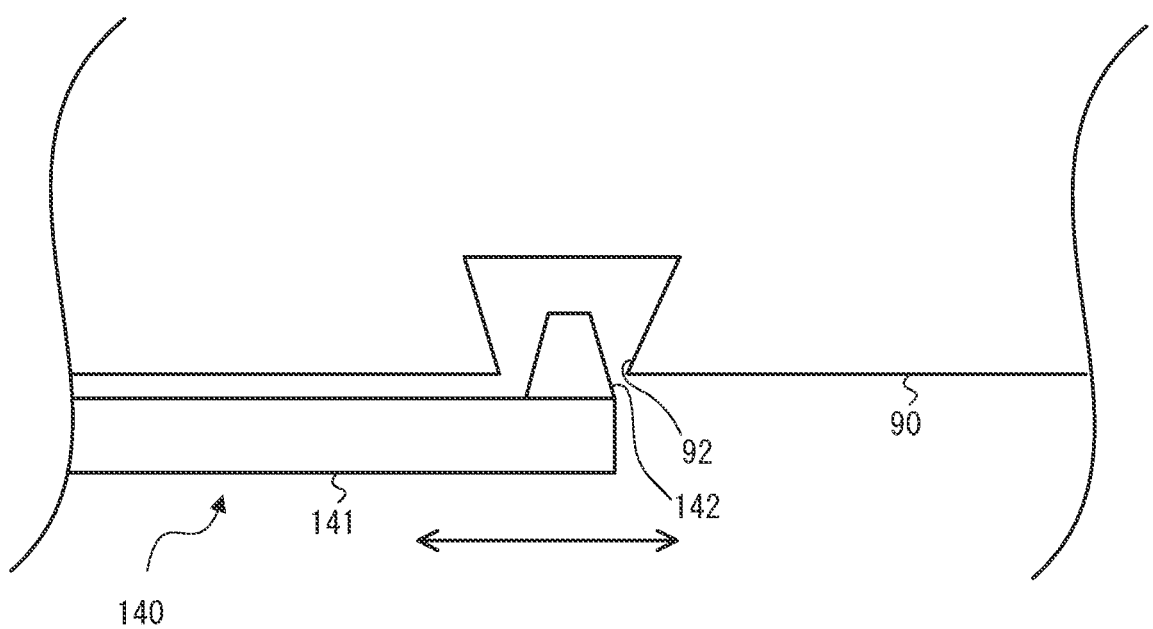
FIG. 16I is a schematic diagram showing a combination of shapes in which an upward internal force occurs at an object.

Next, movements of an object from the placement part 130 into the rack by the autonomous mobile robot 10 will be described with reference to a flowchart. FIG. 15 is a flowchart showing an example of a flow of movements of an object from the placement part 130 into the rack by the autonomous mobile robot 10. Note that it is assumed that the autonomous mobile robot 10 has already moved to a predetermined position in front of the rack.

In a step S200, the control unit 100 rotates the arm 140. That is, the control unit 100 rotates the projection part 142 of the arm 140 so that the projection part 142 points upward. As a result, the projection part 142 enters the groove 92. Note that if the projection part 142 is not positioned at the position of the groove 92, the control unit 100 may adjust the position of the projection part 142 before performing the step S200. Further, if the projection part 142 of the arm 140 has already been inserted into the groove 92, the step S200 may be omitted (or skipped).

Next, in a step S201, the control unit 100 extends the arm 140 by a predetermined distance. That is, the control unit 100 extends the tip of the arm 140 hooked in the groove 92 toward the rack.

Next, in a step S202, the control unit 100 rotates the arm 140. That is, the control unit 100 rotates the projection part 142 of the arm 140 so that the projection part 142 points a direction other than the upward direction (e.g., points in a horizontal direction). As a result, the projection part 142 comes out of the groove 92.

Next, in a step S203, the control unit 100 returns (i.e., retracts) the arm 140 by a predetermined distance.

Through the above-described movements, the object is moved from the placement part 130 into the rack. However, in the case where a plurality of grooves 92 are formed in the bottom surface of the object as described above, the control unit 100 repeats the above-described operations from the step S200 to the step S203.

An embodiment has been described so far. According to the conveyance system in accordance with this embodiment, an object is moved onto the placement part 130 by the horizontal movement of the arm 140. Therefore, it is possible to place an object, which is stored in the rack in such a manner that the object can be pulled out therefrom, on the placement part 130 of the autonomous mobile robot 10, and convey the object while keeping it placed on the placement part 130. Further, it is possible to move an object from the placement part 130 into the rack by the horizontal movement of the arm 140. Therefore, it is possible to store the object into the rack. In particular, since the object is moved by the movement of the arm 140 in the direction from the autonomous mobile robot 10 toward the rack or the direction opposite thereto, the object can be moved through simple control as compared to the case where a complicated manipulator or the like is used. Further, since the arm 140 is composed of the shaft part 141 and the projection part 142, the object can be moved by a simple configuration as compared to the case where a complicated manipulator or the like is used.

Note that the present disclosure is not limited to the above-described embodiments, and they may be modified as desired without departing from the scope and spirit of the present disclosure. For example, the groove 92 may be formed by hollowing out a part of the bottom surface of the object 90 or formed by a frame provided on the bottom surface. Further, although the arm 140 is disposed inside the placement part 130 in the above-described embodiment, the arm 140 may be disposed on the lower surface of the placement part 130.

Further, for example, the shape of the projection part 142 and the shape of the groove 92 may be a combination of shapes in which no upward internal force occurs at the object 90 when the arm 140 moves in the horizontal direction in the state in which the projection part 142 is inserted in the groove 92. Each of FIGS. 16A to 16D is a schematic diagram showing a combination of shapes in which no upward internal force occurs at the object 90, and each of FIGS. 16E to 16I is a schematic diagram showing a combination of shapes in which an upward internal force occurs at the object 90. As shown in FIGS. 16A to 16D, for example, in the case where the shapes of the projection part 142 and the grooves 92 (more specifically, the shapes on the cross section on the vertical plane parallel to the moving direction of the arm 140 (i.e., parallel to the moving direction of the object 90)) are both rectangular shapes or trapezoidal shapes in which the upper side is longer than the lower side, they are a combination of shapes in which no upward internal force occurs at the object 90. With such shapes, it is possible, when the object 90 is moved by the arm 140, to prevent the projection part 142 from being dislodged from the groove 92.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A robot configured to convey an object, the robot comprising:
   a placement part;
   an arm configured to extend from and retract into the placement part in a horizontal direction, the arm comprising a gear; and
   a first ball screw disposed parallel to the horizontal direction, the first ball screw comprising a first nut gear, the first nut gear engaged with the gear of the arm.

2. The robot according to claim 1, wherein the arm comprises a shaft part extending in the horizontal direction, and a projection part located at a tip of the shaft part and extending in a direction perpendicular to the shaft part.

3. The robot according to claim 2, wherein the projection part rotates according to a control by a control unit by using the shaft part as a rotation shaft.

4. The robot according to claim 2, further comprising
   a second ball screw disposed parallel to the shaft part of the arm and the first ball screw, the second ball screw comprising a second nut gear; and
   a slider configured to house the first and second nut gears, and move in a direction in which the shaft part extends as the first and second nut gears move, wherein
   the shaft part of the arm comprises the gear, and
   the gear is engaged with the first and second nut gears inside the slider.

5. The robot according to claim 1, wherein a height of the placement part changes according to a control by a control unit.

6. A method for conveying an object by using a robot, the robot comprising a placement part, an arm configured to extend from and retract into the placement part in a horizontal direction, and a first ball screw disposed parallel to the horizontal direction, the first ball screw comprising a first nut gear engaged with a gear of the arm, the method comprising:
   rotating the first ball screw in a first rotation direction; and
   rotating the first ball screw in a second rotation direction opposite to the first rotation direction.

* * * * *